US012560804B2

(12) United States Patent
Redon et al.

(10) Patent No.: US 12,560,804 B2
(45) Date of Patent: Feb. 24, 2026

(54) TRANSMISSION OPTICAL SYSTEM WITH LIMITED GHOST IMAGE VISIBILITY, SYSTEM AND METHOD FOR EVALUATING GHOST IMAGE VISIBILITY OF A TRANSMISSION OPTICAL SYSTEM

(71) Applicant: Essilor International, Charenton-le-pont (FR)

(72) Inventors: Justine Redon, Charenton-le-pont (FR); Hélène Maury, Charenton-le-pont (FR); Mamonjy Cadet, Charenton-le-pont (FR); Nicolas Maitre, Charenton-le-pont (FR)

(73) Assignee: Essilor International, Charenton-le-Pont (FR)

( * ) Notice: Subject to any disclaimer, the term of this patent is extended or adjusted under 35 U.S.C. 154(b) by 358 days.

(21) Appl. No.: 18/031,393

(22) PCT Filed: Oct. 21, 2021

(86) PCT No.: PCT/EP2021/079247
§ 371 (c)(1),
(2) Date: Apr. 12, 2023

(87) PCT Pub. No.: WO2022/084461
PCT Pub. Date: Apr. 28, 2022

(65) Prior Publication Data
US 2023/0375828 A1 Nov. 23, 2023

(30) Foreign Application Priority Data
Oct. 23, 2020 (EP) .................................... 20306264

(51) Int. Cl.
*G02B 27/00* (2006.01)
*G02B 1/11* (2015.01)

(52) U.S. Cl.
CPC ............ *G02B 27/0018* (2013.01); *G02B 1/11* (2013.01)

(58) Field of Classification Search
CPC ................................ G02B 27/008; G02B 1/11
(Continued)

(56) References Cited

U.S. PATENT DOCUMENTS 5,193,028 A     3/1993  Noguchi
12,310,659 B2 *   5/2025  Perrin ....................... A61B 3/04
(Continued)

FOREIGN PATENT DOCUMENTS

CN          107730545 A   *  2/2018   ............... A61B 3/10
CN          119960176 A   *  5/2025
(Continued)

OTHER PUBLICATIONS

International Search Report in corresponding PCT Application No. PCT/EP2021/079247, mailed Jan. 31, 2022.

*Primary Examiner* — Tarifur R Chowdhury
(74) *Attorney, Agent, or Firm* — Norton Rose Fulbright US LLP

(57) ABSTRACT

According to the invention, a first coating and a second coating are configured so that the optical system has a colorimetric parameter of evaluation of ghost image visibility lower than a predetermined threshold, said colorimetric parameter of evaluation being based on total ghost image transmission coefficient of at least one ghost image formed by internal reflection of a light beam from a light source between at least the first surface and the second surface and by transmission through the optical system, the total ghost image transmission coefficient being integrated over a visible spectral band and depending on a spectrum of the light source.

18 Claims, 7 Drawing Sheets

(58) Field of Classification Search
USPC ........................................................ 359/601
See application file for complete search history.

(56)                       References Cited

U.S. PATENT DOCUMENTS

| 2005/0225878 | A1 * | 10/2005 | Tanaka ............... G02B 27/0018 |
| | | | 359/722 |
| 2011/0051240 | A1 * | 3/2011 | Lin ........................ G02B 30/30 |
| | | | 359/464 |
| 2011/0170195 | A1 * | 7/2011 | Muratani ............... G02B 1/115 |
| | | | 359/601 |
| 2012/0050872 | A1 * | 3/2012 | Ito ........................ G02B 27/646 |
| | | | 359/601 |
| 2012/0188647 | A1 * | 7/2012 | Tanaka ........... G02B 15/145121 |
| | | | 359/683 |
| 2020/0284962 | A1 | 9/2020 | Haaland |

FOREIGN PATENT DOCUMENTS

| EP | 1584954 | A2 * | 10/2005 | ......... G02B 27/0018 |
| EP | 4439131 | A1 * | 10/2024 | ........ G01M 11/0285 |
| JP | H03102301 | | 4/1991 | |
| JP | 2003240905 | | 8/2003 | |
| JP | 2005181956 | | 7/2005 | |
| JP | 2005284040 | | 10/2005 | |
| JP | 2012163779 | | 8/2012 | |
| JP | 2018141847 | | 9/2018 | |
| WO | WO 2002014930 | | 2/2002 | |
| WO | WO 2012/076714 | | 6/2012 | |

* cited by examiner

Fig.4
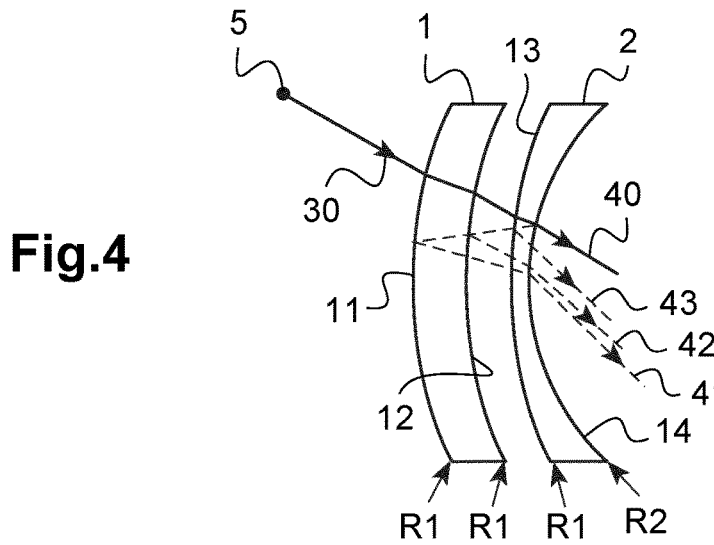
Fig.5A
Fig.5B
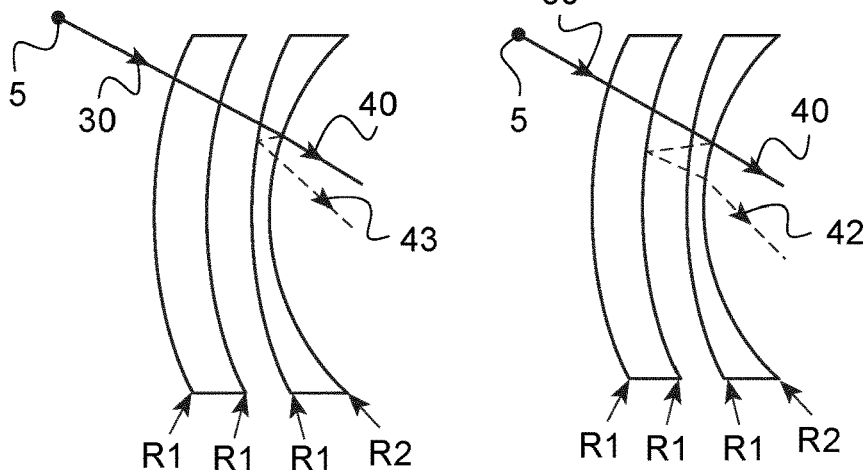
Fig.5C
Fig.5D
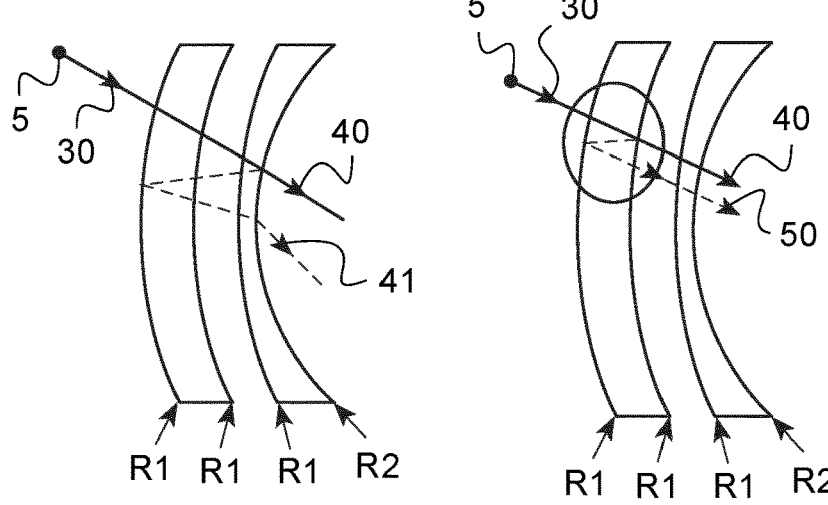

TRANSMISSION OPTICAL SYSTEM WITH LIMITED GHOST IMAGE VISIBILITY, SYSTEM AND METHOD FOR EVALUATING GHOST IMAGE VISIBILITY OF A TRANSMISSION OPTICAL SYSTEM

CROSS-REFERENCE TO RELATED APPLICATIONS

This application is a national phase application under 35 U.S.C. § 371 of International Application No. PCT/EP2021/079247 filed 21 Oct. 2021, which claims priority to European Patent Application No. 20306264.1 filed 23 Oct. 2020. The entire contents of each of the above-referenced disclosures is specifically incorporated by reference herein without disclaimer.

TECHNICAL FIELD OF THE INVENTION

The invention relates to a transmission optical system having low ghost image visibility and to a system and method for evaluating ghost image visibility in a transmission optical system.

The invention also relates to a device and a method for reducing ghost image visibility in an optical system comprising one or several lenses.

The invention also relates to a method for optimizing at least one anti-reflective coating of a transmission optical system so as to reduce ghost image visibility.

BACKGROUND INFORMATION AND PRIOR ART

Ghost image is a physical phenomenon generally due to internal reflection inside one or several lenses. The ghost image is visible when looking at a light source through an optical system comprising at least one lens. A ghost image is only visible for lenses with dioptric power or prism because it separates angularly the ghost image from the direct image of the light source. A ghost image may also appear when a first lens is clipped on another spectacle lens due to spurious reflections between the surfaces of the first lens and the other lens.

Depending on its color and intensity, a ghost image can be a source of discomfort for the wearer.

Numerous documents describe devices and methods for manufacturing optical system with anti-reflective coatings to bring comfort in particular conditions such as night drive and to limit or avoid ghost images of a light source.

However, ghost image visibility depends on multiple parameters such as convex and concave surfaces reflectance and transmittance properties, as well as substrate absorptance and light source spectrum.

Patent document U.S. Pat. No. 5,193,028 discloses a transmission optical system including a plurality of transmission optical elements having at least two boundary reflection surfaces which form a ghost image when light is reflected by at least the two boundary reflection surfaces. The two boundary reflection surfaces are coated with two anti-reflective coatings having complementary reflection spectral curves to eliminate the ghost image over a wide wavelength band.

The publication "Ophthalmic lenses and dispensing", pages 75-87, 2008-01-01, Elsevier, XP055039205, discloses multilayers and broadband anti-reflection coatings to prevent ghost images from disturbing vision through an optical system, based on calculated or measured reflectance spectra in the 400-700 nm range with light incident and reflected under normal angle of incidence. Document US 2020/0284962 relates to methods, systems and compositions that reduce the actual and perceived glare when viewing through a partially transparent material, by incorporating an optical absorber in the partially transparent material.

For a lens with anti-reflective coatings, each anti-reflective coating may be defined using colorimetric parameters expressed in CIE color coordinates (C, h°, Rv), where C represents chroma, h the hue angle, and Rv the luminosity of the color based on the human eye sensitivity from CIE 1931 photopic observer and D65 standard reference illuminant.

Ghost image visibility is related to phenomena of few or multiple internal reflections. Moreover, for optical systems with more than two surfaces, each additional surface results in additional ghost images.

Empirically, applying an anti-reflective coating on at least one surface of an optical system enables to decrease ghost image visibility. However, using conventional anti-reflective coatings on all surfaces is not enough to avoid ghost images in a predictive manner.

There is no method for evaluating numerically ghost image visibility in transmission optical systems with two or more surfaces.

There is no method for optimizing one or several coatings in a transmission optical system so as to minimize ghost image visibility.

Thus, there is a need for a criterion, system and/or method for evaluating ghost image visibility in transmission optical systems with two or more surfaces.

Also, there is a need for a method to optimize anti-reflective coatings in optical systems with two or more surfaces so as to avoid or limit ghost image visibility.

SUMMARY OF THE INVENTION

Therefore one object of the invention is to provide a transmission optical system having at least a first surface and a second surface, the first surface and the second surface having different curvatures and/or the first surface and the second surface being disposed to provide dioptric power, wherein the transmission optical system has a colorimetric parameter of evaluation of ghost image visibility lower than a predetermined threshold for ghost image visibility, said colorimetric parameter of evaluation being based on total ghost image transmission coefficient of at least one ghost image formed by internal reflection of a light beam from a light source between at least the first surface and the second surface and by transmission through the optical system, the light beam from the light source being incident on the first surface with a non-null incidence angle, the total ghost image transmission coefficient resulting from integration of ghost image transmittance of said at least one ghost image over a visible spectral band and depending on a spectrum of the light source and on spectral light efficiency for a CIE 1964 photopic observer.

According to a particular and advantageous aspect, the transmission optical system having exactly two surfaces with different curvatures, each ghost image formed by internal reflection of the light beam between said two surfaces of the optical system having and by transmission through the optical system has a ghost image transmittance calculated using the following formula:

$$T(\lambda,15°)=T_{Cx}(\lambda,15°).R_{BCc}(\lambda,\alpha).R_{BCx}(\lambda,\alpha).T_{Cc}(\lambda,\alpha). (T_{Int}(\lambda,\alpha))^3$$

where $\lambda$ represents the wavelength in the visible spectrum, the incidence angle of the light source being set to 15 degrees and corresponding to an angle of refraction $\alpha$ inside a substrate supporting the first surface and the second surface, $T_{C_x}$ ($\lambda$, 15°) represents the spectral transmission of the first surface at said incidence angle, $R_{BCc}$ ($\lambda$, $\alpha$) represents the spectral reflection of the second surface at said angle of refraction $\alpha$ for reflection occurring inside of the substrate medium, $R_{BC_x}$ ($\lambda$, $\alpha$) the spectral reflection of the first surface for a reflection occurring inside of the substrate medium, $T_{Cc}$ ($\lambda$, $\alpha$) the spectral transmission of the second surface and $T_{int}$ ($\lambda$, $\alpha$) the spectral transmission between the first surface and second surface.

According to a particular embodiment, the total ghost image transmission coefficient is calculated using the following formula:

$$\tau_{GI}(15°) = 100\frac{\int_{380}^{780} S(\lambda)\ T(\lambda, 15°)\ \overline{y}_{10}(\lambda)\, d\lambda}{\int_{380}^{780} S(\lambda)\ \overline{y}_{10}(\lambda)\, d\lambda}$$

wherein the visible spectral band extends between 380 and 780 nanometers, $S(\lambda)$ represents spectral luminance of the light source, and $\overline{y}_{10}(\lambda)$ represents spectral light efficiency for a CIE 1964 photopic observer.

According to a particular aspect, the first surface comprises a first coating and the second surface comprising a second coating.

In a specific embodiment, the transmission optical system further comprises at least another surface comprising another coating, wherein each pair of two different surfaces among the first surface, second surface and the at least another surface having different pairs of curvatures forms a particular ghost image, and each particular ghost image having a particular ghost image transmittance, and wherein the first coating, second coating and said another coating are configured so that each particular ghost image has a total ghost image transmission coefficient lower than the predetermined threshold.

According to a particular aspect, the ghost image transmittance of a total ghost image formed by superimposition of different ghost images is calculated using the following formula:

$$T_G(\lambda) = T_{total\ system}(\lambda)\sum_{XY}(R_X(\lambda)*R_Y(\lambda))\left(\prod_Z^n T_{int}(\lambda)\right)^2\left(\prod_W^p T(\lambda)\right)^2$$

$$T_{total\ system}(\lambda) = \left(\prod_s^m T_{int}(\lambda)\right)\left(\prod_l^k T(\lambda)\right)$$

$$T_{GI} = 100\frac{\int_{380}^{780} S(\lambda)\ T_G(\lambda)\ \overline{y}_{10}(\lambda)\, d\lambda}{\int_{380}^{780} S(\lambda)\ \overline{y}_{10}(\lambda)\, d\lambda}$$

wherein XY represents any couple of surfaces X and Y having a same combination of two radius of curvature, Z any substrate between the surfaces X and Y, and W each other surface different from surfaces X and Y located between the surfaces X and Y, R representing the reflectance of the considered interface, T representing the surface transmittance and $T_{int}$ representing transmission of said substrate.

Alternatively, according to another specific embodiment wherein the transmission optical system further comprises at least another surface comprising another coating, each pair of two different surfaces among the first surface, second surface and at least another surface having a same pair of curvatures forming a component of a same particular ghost image having a component ghost image transmittance, and wherein the first coating, second coating and said another coating are configured so that for the same particular ghost image, the total ghost image transmission coefficient is calculated as a function of a sum of the different components of the same particular ghost image transmittance and is lower than the predetermined threshold.

In particular, the total ghost image transmission coefficient of each ghost image is calculated using the following formula:

$$\tau_{GI}(15°) = 100\frac{\int_{380}^{780} S(\lambda)\sum T(\lambda, 15°)\ \overline{y}_{10}(\lambda)\, d\lambda}{\int_{380}^{780} S(\lambda)\ \overline{y}_{10}(\lambda)\, d\lambda}$$

wherein the visible spectral band extends between 380 and 780 nanometers, $S(\lambda)$ represents spectral luminance of the light source, and $\overline{y}_{10}(\lambda)$ represents spectral light efficiency for a CIE 1964 photopic observer and $\Sigma T(\lambda, 15°)$ represents the sum of all the ghost image transmittance components of two surfaces having a same couple of curvatures.

According to a particular aspect, the total ghost image transmission coefficient is further based on a number of surfaces of the transmission optical system, on transmission coefficients of each surface and on transmission coefficients of each substrate supporting the surfaces of the transmission optical system.

For example, the light source is a light emitting diode having a colour temperature comprised between 2700 Kelvin and 6000 Kelvin.

According to a particular aspect, the predetermined threshold for ghost image visibility is less than 0.010% and preferably is 0.007%.

Preferably, the transmission optical system comprises at least one anti-reflective coating on the first surface and/or second surface.

According to particular embodiments, the at least one anti-reflective coating comprises a pair of coatings consisting of a first anti-reflective coating on the first surface and a second anti-reflective coating on the second surface, wherein said pair of coatings is selected among the following pairs: a blue anti-reflective coating and a copper anti-reflective coating; a blue anti-reflective coating and a green anti-reflective coating; an orange mirror and a blue anti-reflective coating; a blue mirror and a copper anti-reflective coating; a green anti-reflective coating and a copper anti-reflective coating; a copper anti-reflective coating and a copper anti-reflective coating.

According to particular embodiment, the at least one anti-reflective coating comprises a pair of coatings consisting of a first anti-reflective coating on the first surface and a second anti-reflective coating on the second surface, wherein said pair of coatings comprises at least one of: a copper anti-reflective coating, a green anti-reflective coating and an orange mirror coating.

Advantageously, the copper anti-reflective coating comprises a multi-layered stack comprising at least six layers, said multi-layered stack comprising, along a direction going away from the substrate, a silicon dioxide layer having a thickness of about 150 nm, a layer of zirconium dioxide having a thickness of from 14 nm to 16 nm, a silicon dioxide layer having a thickness of from 28 nm to 32 nm, a layer of zirconium dioxide having a thickness of from 87 nm to 93 nm, a layer of tin oxide or indium-tin oxide having a thickness of about 6,5 nm, and a silicon dioxide layer having a thickness of from 71.7 nm to 77 nm.

According to particular embodiment, said pair of coatings comprises a copper anti-reflective coating and at least one of a blue mirror or a blue anti-anti-reflective coating.

A further object of the invention is to provide a method for evaluating ghost image visibility of a transmission optical system having at least a first surface and a second surface, the first surface and the second surface having different curvatures and/or the first surface and the second surface being disposed to provide dioptric power.

The above objects are achieved according to the invention by providing a method for evaluating ghost image visibility comprising a step of determining a colorimetric parameter of evaluation of ghost image visibility, said colorimetric parameter of evaluation being based on total ghost image transmission coefficient of at least one ghost image formed by internal reflection of a light beam from a light source between the first surface and the second surface and by transmission through the optical system, the light beam from the light source being incident on the first surface with a non-null incidence angle, the total ghost image transmission coefficient resulting from integration of ghost image transmittance of said at least one ghost image over a visible spectral band and depending on a spectrum of the light source and on spectral light efficiency for a CIE 1964 photopic observer.

The above objects are achieved according to the invention by providing a method for optimizing at least one anti-reflective coating of a transmission optical system having at least a first surface and a second surface, the first surface comprising a first coating and the second surface comprising a second coating, wherein at least one of the first coating and the second coating is an anti-reflective coating, the first surface and the second surface having different curvatures and/or the first surface and the second surface being disposed to provide dioptric power.

The above objects are achieved according to the invention by providing a method for optimizing at least one anti-reflective coating comprising the steps of:

a) determining a colorimetric parameter of evaluation of ghost image visibility, said colorimetric parameter of evaluation being based on total ghost image transmission coefficient of at least one ghost image formed by internal reflection of a light beam from a light source between the first surface and the second surface, and by transmission through the optical system, the light beam from the light source being incident on the first surface with a non-null incidence angle, the total ghost image transmission coefficient resulting from integration of ghost image transmittance of said at least one ghost image over a visible spectral band and depending on a spectrum of the light source and on spectral light efficiency for a CIE 1964 photopic observer;

b) modifying a structure and/or composition of the first coating and/or of the second coating, and c) iterating steps a) and b) until the transmission optical system has a colorimetric parameter of evaluation of ghost image visibility lower than a predetermined threshold for ghost image visibility.

A further object of the invention is to provide a system for evaluating ghost image visibility of a transmission optical system having at least a first surface and a second surface, the first surface and the second surface having different curvatures and/or the first surface and the second surface being disposed to provide dioptric power.

According to the present disclosure, said system for evaluating ghost image visibility comprises a processor configured to determine a colorimetric parameter of evaluation of ghost image visibility, said colorimetric parameter of evaluation being based on total ghost image transmission coefficient of at least one ghost image formed by internal reflection of a light beam from a point light source between the first surface and the second surface and by transmission through the optical system, the light beam from the light source being incident on the first surface with a non-null incidence angle, the total ghost image transmission coefficient resulting from integration of ghost image transmittance of said at least one ghost image over a visible spectral band and depending on a spectrum of the light source and on spectral light efficiency for a CIE 1964 photopic observer.

According to a particular aspect, the transmission optical system has a third surface and/or a fourth surface, and said system for evaluating ghost image visibility comprises a processor configured to determine the total ghost image transmission coefficient of each ghost image formed by internal reflection of the light beam between all pairs of surfaces having a same couple of two different curvatures, the total ghost image transmission coefficient depending on a sum of each ghost image transmittance component for all pairs of surfaces having the same couple of two different curvatures.

According to another aspect, the transmission optical system has a third surface and/or a fourth surface, and said system for evaluating ghost image visibility comprises a processor configured to determine the ghost image transmission coefficient of each ghost image formed by internal reflection of the light beam between each couple of surfaces having two different curvatures, the total ghost image transmission coefficient depending on a sum of the ghost image transmission coefficient of each ghost image.

DETAILED DESCRIPTION OF EXAMPLE(S)

The following description with reference to the accompanying drawings will make it clear what the invention consists of and how it can be achieved. The invention is not limited to the embodiment/s illustrated in the drawings. Accordingly, it should be understood that where features mentioned in the claims are followed by reference signs, such signs are included solely for the purpose of enhancing the intelligibility of the claims and are in no way limiting on the scope of the claims.

Reference is now made to the brief description below, taken in connection with the accompanying drawings and detailed description, wherein like reference numerals represent like parts.

In the accompanying drawings:

FIG. 4 represents a cross-section view of a two lens optical system and multiple internal reflections of an incident light beam at the origin of ghost images formation;

FIG. 5A-5C shows each ghost image formed by internal reflection between a pair of surfaces of the two lens optical system; FIG. 5D shows an internal reflection between surfaces of same curvature radius which does not produce a separate ghost image;

Figure 11:
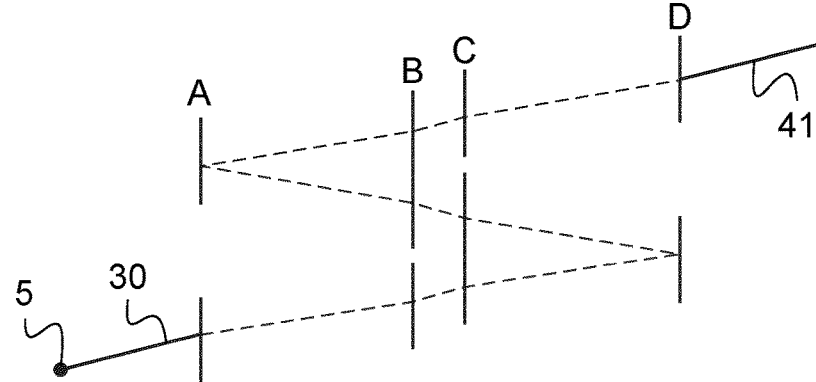
Figure 12:
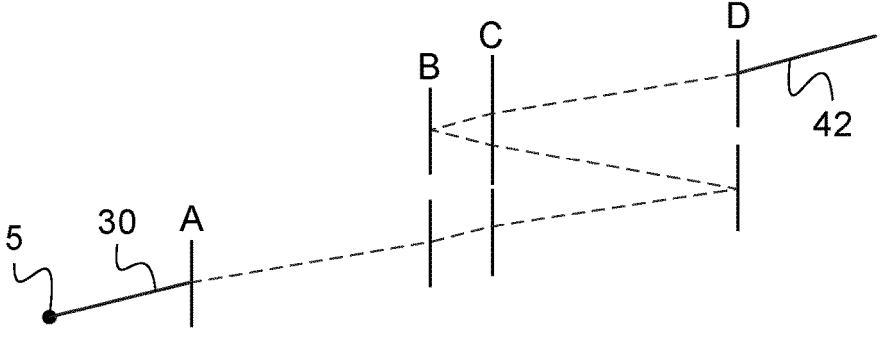
Figure 13:
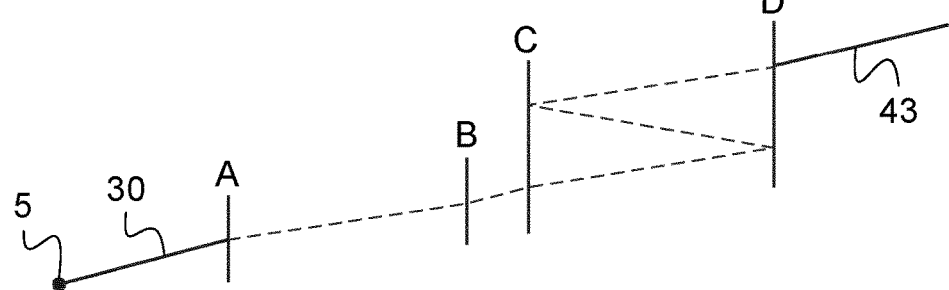
Figure 14:
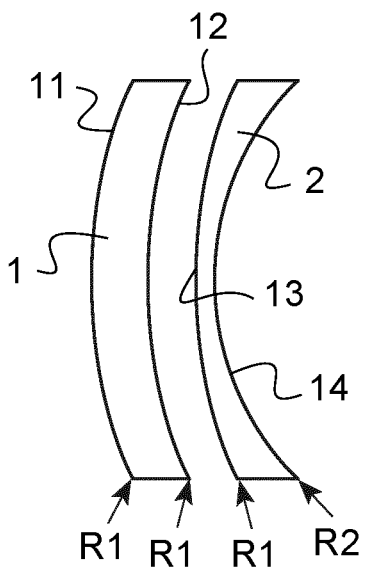
Figure 15:
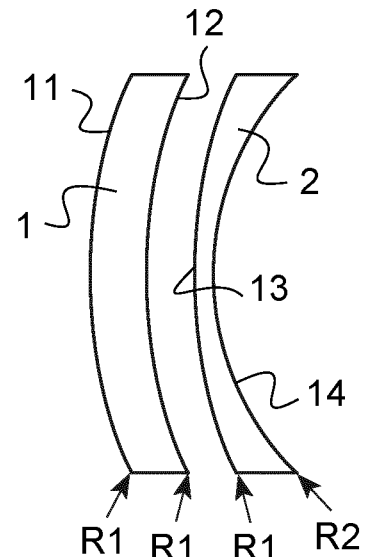
Figure 16:
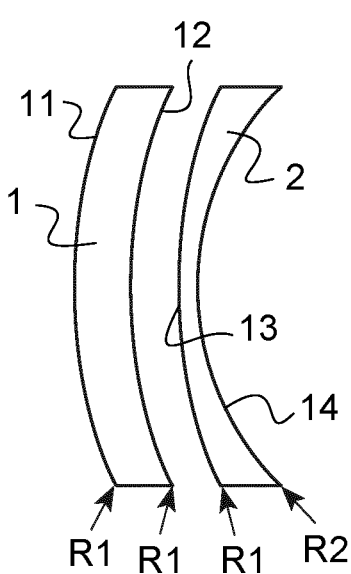
Figure 17:
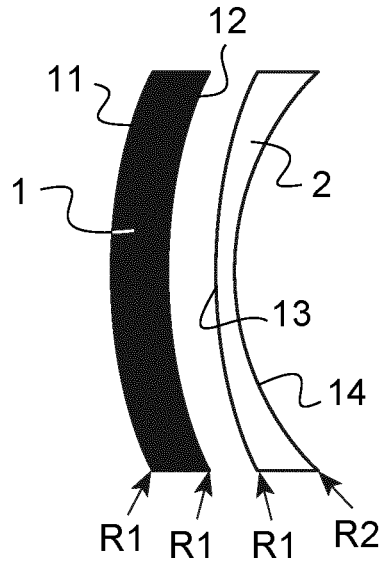

FIG. 11 schematically shows the four surfaces of an optical system and the formation of a ghost image by internal reflection between the first surface, denoted A, and the fourth surface, denoted D;

FIG. 12 schematically shows the four surfaces of an optical system and the formation of a ghost image by internal reflection between the second surface, denoted B, and the fourth surface, denoted D;

FIG. 13 schematically shows the four surfaces of an optical system and the formation of a ghost image by internal reflection between the third surface, denoted C, and the fourth surface, denoted D;

FIGS. 14-17 show different two-lenses optical systems wherein at least one of the coatings is optimized so as to reduce ghost image visibility according to the present disclosure.

In the description which follows the drawings are not necessary to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features that are defined relative to a device can be transposed, individually or in combination, to a process.

Device and Process

Figure 1:
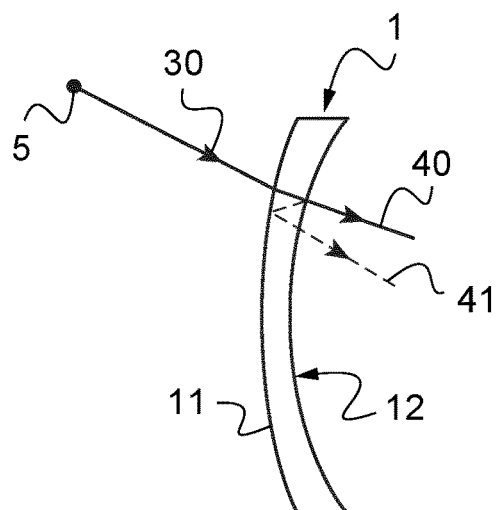
FIG. 1 represents a cross-section view of an ophthalmic lens and internal reflection of an incident light beam at the origin of ghost image formation.

FIG. 1 shows in cross-section an optical system consisting of a single ophthalmic lens 1 having a first surface 11 and a second surface 12. The first surface 11 and the second surface 12 have different curvatures and/or the first surface 11 and the second surface 12 are disposed to provide dioptric power. In general, for an ophthalmic lens, the first surface 11 is convex and the second surface 12 is concave. FIG. 1 also shows a point light source 5 generating an incident light beam 30 directed onto the ophthalmic lens 1 and the two main light paths of the light beam through the lens 1. A direct transmitted light beam 40 is formed when the transmitted light passes directly through the first surface 11 and the second surface 11 of the lens, thus passing once through the lens substrate. A first order reflected light beam 41 is formed when the incident light undergoes an internal reflection on the second surface 12 and then on the first surface 11 of the lens before going through the second surface 12, thus passing twice through the lens substrate. Under particular conditions, a ghost image is formed. In particular, for a point light source 5, when the incidence angle of the incident light beam 30 on the first surface 11 is different from zero, or non-null, the direct transmitted light beam 40 and the first order reflected light beam 41 propagate along angularly separated directions and are liable to form two distinct images of the light source 5. A direct image 6 is formed along the direction of the direct transmitted light beam 40. A ghost image 7 of the light source 5 is formed along the direction of the first order reflected light beam 41. Thus, ghost image formation is a physical phenomenon due to internal reflection inside the lens 1. A ghost image is only visible for lenses with dioptric power or prism because it separates angularly the ghost image 7 from the direct image 6 of the light source through the optical system.

Figure 2:
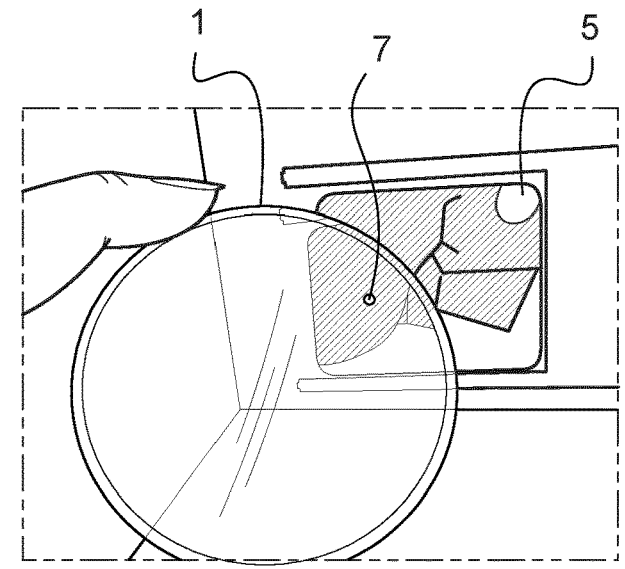
FIG. 2 shows a system for observing the ghost image of a light source through an optical system.

FIG. 2 shows a system for observing ghost images. The ghost image 7 is visible when looking at a point light source 5 through a lens 1. The point light source 5 is for example a light emitting diode or LED. The presence of a ghost image can be a source of discomfort for the wearer, depending on the color and intensity of the ghost image.

Figure 3:
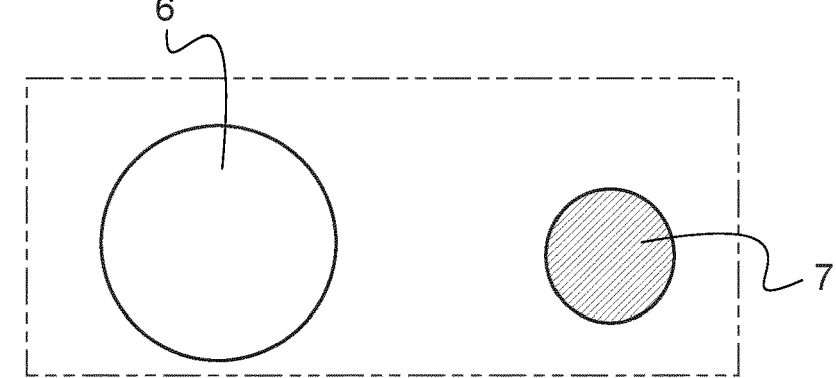
FIG. 3 shows an example of direct image and ghost image of a same light source seen through an optical system.

FIG. 3 shows an example of a direct image 6 and a ghost image 7 formed using a LED source and a lens with a blue coating with high chroma on both sides of the lens. The direct image 6 appears clear and intense on a dark background. The ghost image 7 appears less intense and colored, for example here, blue.

Because light bounces off each side of the lens, the colorimetric properties of the coating deposited on each side has an influence on the ghost image. Let us denote a first coating 21 on the first surface 11 and, respectively, a second coating 22 on the second surface 12. Each of the first and second coatings is selected from the following coatings: anti-reflection coating, mirror coating, and hardcoat. Each coating may consist of a single layer or of a multilayer stack.

It is desirable to maximize the visible transmission of the direct image while minimizing the visibility of the ghost image.

However, the link between colorimetry of the first coating and the second coating and ghost image visibility is not evident. The colorimetry of a coating may be defined using 3D colorimetric coordinates such as (Rv, C, h) where h represents 20 a hue angle, C represents chroma, and Rv represents the luminosity of the colour based on the human eye sensitivity (from CIE 1931 for Rv, CIE 1964 for Chroma and hue and D65 illuminant). When considering a combination of two anti-reflection coatings, there are a lot of colorimetric parameters: Rv, chroma, hue angle for each coating.

Empirically, it is observed that different combinations of anti-reflection coatings on the convex and concave surfaces of a single lens result in significantly different ghost image visibility.

According to a first approximation, for a single lens, the ghost image visibility is linked to both the Rv on the first (convex) surface 11 and Rv on the second (concave) surface 12. However, there are lens configurations with the same coating on the convex side, and two different coatings on the concave side with the same Rv value, that result in significantly different ghost images.

For example, let us consider a lens with a first coating 21 consisting of a blue coating with high chroma and a second coating on the back side. The ghost image appears deep blue when the second coating 22 consists of a blue anti-reflection coating having a Rv of 0.96. However, when the second coating 22 consists of a green antireflection coating, which also has of Rv of 0.96, the ghost image is much darker and almost disappears on the dark background.

Also, it is herein observed that anti-reflection color is generally calculated using the D65 standard illuminant which corresponds to day light illumination. However, the D65 standard illuminant does not seem to be adapted to the observation of ghost images, which generally are formed from a point light source on a dark background.

When an ophthalmic system has more than two surfaces (N≥2), and with one of the surfaces having a different curvature, a plurality of ghost images is liable to appear due to multiple internal reflections between these surfaces.

For an ophthalmic system with two surfaces, there is a single, or first order, ghost image formed by double reflection inside the system. From there, each additional surface results in additional ghost images. Thus, there are (N−1)! potential first order ghost images in a system with N≥2 surfaces.

An ophthalmic system with more than two surfaces usually consists of, without being limited to, combinations of a first lens 1 and a second lens 2. The first lens is generally a plano lens and the second lens a convex lens. Such a combination may be for the purpose of providing prescription to a plano lens (Echromic, sunglasses . . . ). Alternatively, such a combination may be for the purpose of providing an additional function, temporary or not, on top of a refractive lens (such as a set of clips for day or night drive or Augmented Reality lenses).

Among ophthalmic systems having more than two surfaces, most systems have four surfaces arranged in a specific combination of curvature radius for these surfaces. Generally, all surfaces except one surface are parallel to each other or have the same (or nearly the same) curvature radius. The use of a same curvature radius at the interface of two clipped lenses is justified by mechanical constraints.

For example, as illustrated on FIG. 4, the ophthalmic system consists of a first lens 1 and a second lens 2. The first lens 1 has a first convex surface 11 having a first curvature radius, denoted R1, and a second concave surface 12 having the same curvature radius R1. The second lens 2 has a third convex surface 13 having the same first curvature radius, R1, and a fourth concave surface 14 having a second curvature radius, denoted R2 different from R1.

For an ophthalmic system with more than two surfaces, several ghost images are formed. The point light source 5 generates the incident light beam 30 directed onto the first lens 1 of the ophthalmic system with a non-null incidence angle. FIG. 4 shows the main light paths of the light beam through the first lens 1 and second lens 2. A direct transmitted light beam 40 is formed when the transmitted light passes directly through the first surface 11 and the second surface 12 of the first lens 1 and then through the third surface 13 and the fourth surface 14 of the second lens 2. The direct transmitted light beam 40 passes once through the substrate of the first lens 1 and once through the substrate of the second lens 2. A first order reflected light beam 43 is formed when the incident light undergoes an internal reflection on the fourth surface 14 and on the third surface 13 of the second lens 2 before going through the fourth surface 14, thus passing once through the substrate of the first lens 1 and twice through the substrate of the second lens 2 (FIG. 5A).

An other first order reflected light beam 42 is formed when the incident light undergoes an internal reflection on the fourth surface 14 of the second lens 2 and on the second surface 12 of the first lens, and then passes through the third and fourth surfaces of the second lens 2 (FIG. 5B). This other first order reflected light beam 42 thus passes once through the substrate of the first lens 1 and three times through the substrate of the second lens 2. Still another first order reflected light beam 41 is formed when the incident light undergoes an internal reflection on the fourth surface 14 of the second lens 2 and on the first surface 11 of the first lens 1 and then passes through the second, third and fourth surfaces (FIG. 5C). The still another first order reflected light beam 41 thus passes three times through the substrate of the first lens 1 and three times through the substrate of the second lens 2. The first order reflected light beams 43, 42 and 41 are parallel to each other.

This particular configuration has several consequences as regards ghost images. All the ghost images caused by the combination of the same two different curvature radius R1, R2 (FIGS. 5A, 5B, 5C) are combined together in a first order ghost image (FIG. 6) thus being more visible than if they were distinct.

Some ghost images are merged with the direct image because they happen between parallel surfaces (having both the same curvature radius R1), so they are not visible. For example (see FIG. 5D), a reflected light beam 50 is formed by internal reflection on the second surface 12 and on the first surface 11 and is transmitted through the second surface 12 of the first lens and through the third and fourth surfaces of the second lens 2. The reflected light beam 50 generates a ghost image. However, the direct transmitted light beam 40 and the reflected light beam propagate along parallel directions, thus this ghost image is superimposed onto the direct image of the point source 5.

Figure 6:
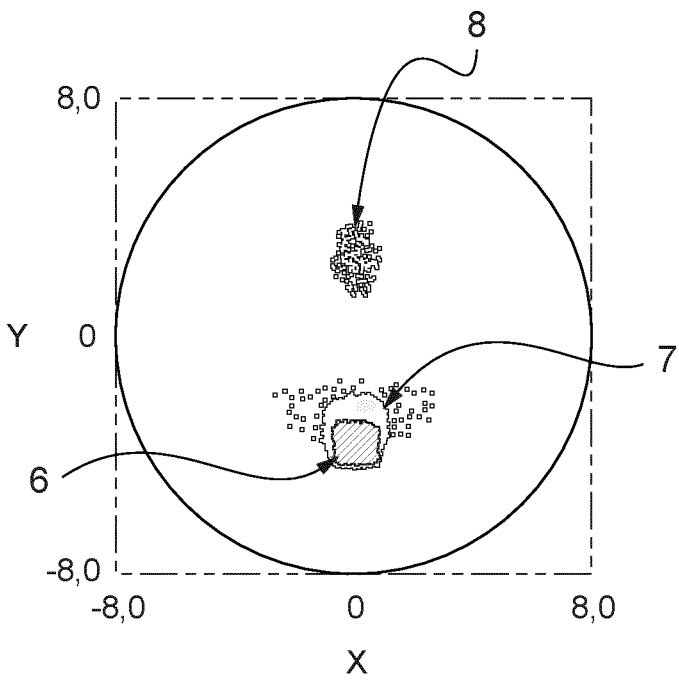
FIG. 6 shows an example of raytracing simulation of ghost image formation in a two lens optical system.

FIG. 6 shows an example of raytracing simulation of ghost image formation in a two lens optical system as illustrated on FIGS. 4 and 5, without coatings. The simulation software used here is Zemax OpticStudio software. The light source used for the simulation is a 40 mm square, placed at a 15 degrees incidence angle from the optical axis, 500 mm away from the eye. The light source has three equally weighted wavelengths: 486 nm, 588 nm, 656 nm. The light source has a color temperature of about 4000K LED. The three ghost images formed by internal reflections in the two lens optical system on a pair of surfaces having different curvature radius (R1=193 mm and R2=117 mm) are combined in a single ghost image 7 spatially offset with respect to the main image 6. Other stray light 8 is also generated. However, this residual stray light 8 is practically non visible to the human eye.

In the case of an ophthalmic system with a single lens, providing the two surfaces (N=2) with regular anti-reflective coatings may be enough to decrease the visibility of the ghost image.

However, in the case of an ophthalmic system with two lenses (with three surfaces with the same curvature radius R1 and one with a different curvature radius R2, as in the previous example), three ghost images of similar intensity are superimposed, consequently the sum of all the three ghost images transmittance is approximately three times higher. However, providing all the surfaces with regular anti-reflective coatings is generally not enough to decrease the visibility of the resulting ghost image below a visibility threshold. More generally, different combinations of curvature radius result in a different number of ghost images which superimpose differently.

Therefore, an object of the present disclosure is to propose other criteria to evaluate ghost image visibility.

More precisely, we propose an appropriate colorimetric parameter for evaluating ghost image visibility. This new parameter is based on the calculation of the ghost image spectrum and also includes the spectrum of the light source and the CIE 1964 observer which is found to be more relevant than the conventional CIE 1931 observer. In the following, the calculation method is specified for ophthalmic systems with at least two surfaces.

The new parameter, total ghost image transmission coefficient, hereinafter denoted $T_{GI}$, represents ghost image transmission for a two-surfaces optical system or total ghost image transmission for an optical system with more than two surfaces, is supported by strong correlation to perception, evidenced by results from a study with untrained observers and from another study with trained observers. Thanks to the perception data, a criterion for risk of ghost image for combinations of antireflection coatings can be built and integrated at the step of the antireflection design for optical systems with at least two surfaces. We also determine a numerical threshold for ghost image visibility.

1. Definition and Calculation of $T_{GI}$ in an Optical System with Two Surfaces To calculate colorimetric parameters, in a first step, we use the transmittance spectrum of the ghost image. The transmittance spectrum enables to obtain descriptive information on the ghost image color. We derive therefrom a numerical parameter describing and evaluating ghost images concisely and accurately.

Currently, ghost image cannot be measured directly and would require very specific spectrometry equipment and conditions of acquisition, so it is modelized.

A numeric simulation tool has been developed on Matlab to calculate the transmittance spectrum of the ghost image. The transmittance spectrum of the ghost image can also be calculated on the Macleod software vStack function (available with Macleod Enhanced Edition).

Figure 7:
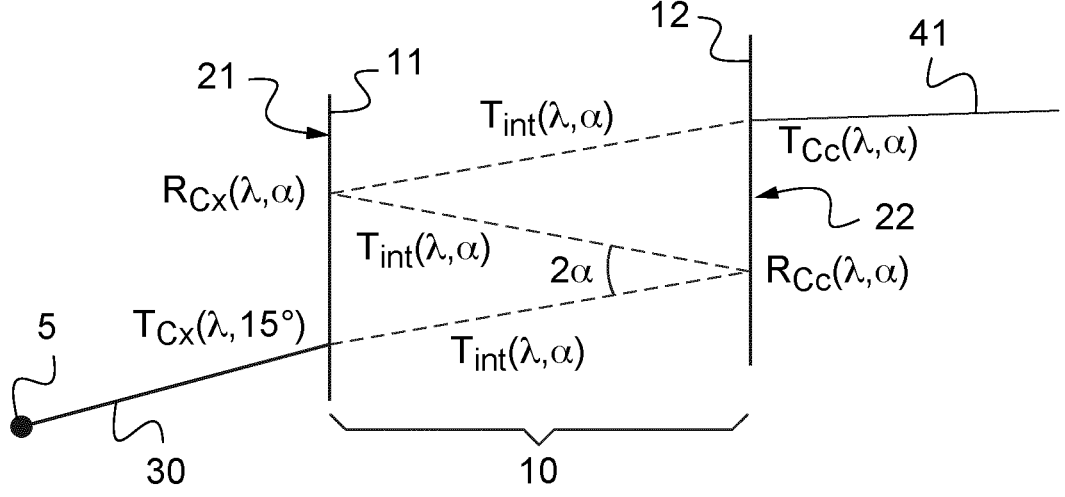
FIG. 7 shows the different parameters (incidence angle, refraction angle, transmission and reflection coefficients of a two-surfaces optical system) used for determining ghost image transmission.

The numeric simulation is based on the following assumptions schematically illustrated on FIG. 7:

approximation of two parallel surfaces (lens correction not accounted),
   substrate absorption and thickness are taken into account,
   calculation made with an incidence angle of 15 degrees.

The incidence angle is set at 15 degrees to represent an average observation angle. However, any non-null incidence angle, preferably between 5 and 30 degrees, can be used if necessary to match more particular sets of conditions.

The color of the ghost image is calculated using the transmittance of the ghost image in the 380-780 nm spectral range.

The reference illuminant for color calculation is usually D65, the standard illuminant representing daylight. However, ghost images are not observed under daylight because a point light source is needed, which "daylight" isn't. Sunlight is generally not suitable either because people usually do not look directly at the sun.

Consequently, the reference illuminant selected here is the specific light source that is used to observe and which has been measured. For example, the reference illuminant is a LED having a color temperature comprised between 2700 Kelvin and 6000 Kelvin, in particular a 4000K LED, or any point source such as a filament lamp, a halogen lamp, or even the sun. In the present document, a point light source is a light source which appears small compared to the field of view of the observer through the lens. For example, the angular size of the source is more than 5-10 times smaller than the total field of view of the observer. Calculations done in the present disclosure approximate the source as a point source, as intended by usual definition in optics.

Color is calculated with the following tools: the necessary color calculation functions have been implemented on Matlab (also available as a commercial toolbox), and Macleod has a built-in color calculation function.

In the CIE XYZ color coordinates system, the Rv of an anti-reflection coating corresponds to the Y tristimulus value (the value representing luminance) calculated from the reflectance of the anti-reflection with the 2 degrees observer (CIE 1931 observer). $T_{GI}$ is herein defined as the Y tristimulus value of the ghost image transmittance, calculated instead with the 10 degrees observer (or CIE 1964 observer). The 10 degrees observer is an updated version of the 2 degrees observer, providing corrections in the blue wavelength range, and is the CIE recommendation for color calculation. Like the $R_V$, $T_{GI}$ is expressed in %. In other words, $T_{GI}$ corresponds to a colorimetric parameter representing the luminance of the color of the ghost image based on the human eye sensitivity from CIE 1964 photopic observer and based on the spectrum of a point source illuminant (instead of D65 standard reference).

Figure 8:
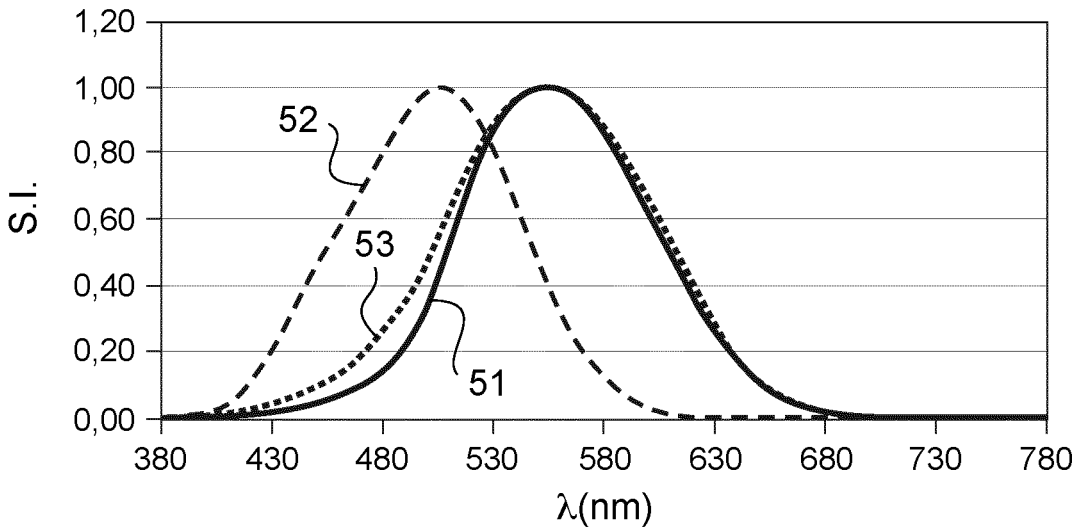
FIG. 8 represents the spectral light efficiency for different types of observers in day time and respectively in night time vision conditions.

FIG. 8 shows the spectral light efficiency (S.I. in arbitrary units)) for different types of observers in day time (or photopic) and respectively in night time (or scotopic) vision conditions. The curve 51 shows the spectral light efficiency for a photopic CIE 1931 observer, i.e. a 2 degrees observer in day time vision condition. The curve 52 shows the spectral light efficiency for a scotopic CIE 1951 observer, i.e. a 2 degrees observer in night time vision condition. The curve 53 shows the spectral light efficiency for a photopic CIE 1964 observer, i.e. a 10 degrees observer in day time vision condition, selected according to the present disclosure to evaluate ghost image visibility.

In the present case, the CIE 1964 observer is selected for two reasons. Firstly, the ghost image has a color (in most cases), and CIE 1964 observer is the recommended observer for color calculation, whereas the CIE 1931 observer is used for standard values such as Rv. The second reason is linked to experimental results and will be described later.

For a ghost image visibility criterion, there are no preexistent standards requiring the use of the 1931 observer. Consequently, we propose to use the 1964 observer, which seems more appropriate to us for the above reasons.

The transmission of ghost image, or ghost image transmission coefficient, denoted $T_{GI}$, for two-surfaces optical system is calculated by the following expression (I):

$$T_{GI}(15°) = 100 \frac{\int_{380}^{780} S(\lambda)\, T(\lambda, 15°)\, \bar{y}_{10}(\lambda)\, d\lambda}{\int_{380}^{780} S(\lambda)\, \bar{y}_{10}(\lambda)\, d\lambda}$$

where $S(\lambda)$ represents the spectrum of the light source depending on the wavelength $\lambda$ in the visible spectral range between 380 nm and 780 nm, $T(\lambda, 15°)$ the ghost image transmittance depending on the wavelength $\lambda$ for an incidence angle of 15 degrees, and $\bar{y}_{10}(\lambda)$ is the spectral light efficiency for a CIE 1964 photopic observer (also known as '10° observer').

The ghost image transmittance for a two-surface optical system is calculated using the following expression (II):

$$T(\lambda, 15°) = T_{Cx}(\lambda, 15°).\, R_{BCc}(\lambda, \alpha).\, R_{BCx}(\lambda, \alpha).\, T_{Cc}(\lambda, \alpha).\, T_{int}(\lambda, \alpha))^3$$

where $T_{Cx}(\lambda, 15°)$ represents the spectral transmission of the incident light beam through the first (convex) surface 11 for an incidence angle of 15 degrees depending on the wavelength $\lambda$, $R_{BCc}(\lambda, \alpha)$ represents the spectral reflection of the light beam on the second (concave) surface 12 for a reflection occurring from the inside of the substrate medium for a refraction angle $\alpha$ depending on the wavelength $\lambda$, $R_{Bcx}(\lambda, \alpha)$ represents the spectral reflection of the light beam on the first (convex) surface 11 for a reflection occurring from the inside of the substrate medium for the refraction angle $\alpha$ depending on the wavelength $\lambda$, $T_{Cc}(\lambda, \alpha)$ represents the spectral transmission of the light beam through the second (concave) surface 12 for a transmission occurring from the substrate medium to the air for a refraction angle $\alpha$ depending on the wavelength $\lambda$, and $T_{int}(\lambda, \alpha)$ represents the spectral transmission of the light beam through the substrate supporting the first and second surfaces for the refraction angle $\alpha$ depending on the wavelength $\lambda$, (see also FIG. 7).

For the incidence angle of 15 degrees, the refraction angle $\alpha$ derives from the Snell-Descartes formula:

$$n_{air} \sin(15°) = n_{substrate} \sin(\alpha)$$

where $n_{air}$ is the refractive index of air, and $n_{substrate}$ is the refractive index of the lens substrate.

In the case of an optical system with two-surfaces, we have determined a numerical threshold for ghost image visibility of 0.007%. In other words, in the case N=2, the numerical threshold of ghost image visibility is identified as $T_{GI}=0.007\%$.

Using the above formula $T_{GI}(15°)$, the coatings on the first and second surfaces can be optimized so as to obtain a transmission of ghost image that is below the numerical threshold value of ghost image visibility of 0.007%.

The new parameter, the ghost image transmission coefficient, $T_{GI}$ is supported by strong correlation to perception, as evidenced by results from a study with untrained observers and from another study with trained observers. Thanks to the perception data, a criterion for risk of ghost image for combinations of antireflection coatings can be built and integrated at the step of the antireflection design for optical systems with at least two surfaces.

More precisely, the numerical threshold value of ghost image visibility has been determined empirically using two independent methods: a first method based on machine learning, and a second method based on scoring by expert observers and correlated to the $T_{GI}$.

2. Determination of $T_{GI}$ Threshold through Machine Learning

We prepared a set of 28 lenses coated with different combinations of anti-reflection coatings (or AR combinations). All the other lens parameters are identical (dioptric power: −2.00 D, substrate: CR39, index-matched hardcoat at 1.5).

On one side, colour data is associated with each lens/AR combination. Ghost image color coordinates ($T_{GI}$, a*, b*, C*, h) are calculated for each lens as explained in the previous paragraphs, with the light source spectrum $S(\lambda)$ of the 4000LED (neutral white) used for observation. The convex and concave AR colors (Rv, a*, b*, C*, h) (Cx color and Cc color) are calculated from the reflectance measurements of the exact same lenses that were observed in the study, and the spectrum of the 4000K LED. For this study, in the same fashion as the $T_{GI}$, the $Y_{10}$ is calculated with the 1964 observer (instead of Rv with a 1931 observer).

On the other side, perception data is gathered. An internal perception study was conducted with the 28 lenses and 16 observers. Ghost image was observed under specific conditions. In particular, these conditions involve a 4000K LED as the source, a light grey background and artificial lighting of the room switched on. This specific set of conditions is made to be closer to actual daily conditions, contrary to the other sets of conditions, such as "black background and dark environment" that make ghost images more visible.

Consequently, in these conditions, there are some lenses where the observer cannot see any ghost image. The observer is asked to specify which lenses had no ghost images at all (or, in other words, ghost image not visible).

With 16 observers, and 39 lenses (some of the 28 lenses were presented twice), we have 16*39=624 data points, which are labelled either 0 (ghost image is visible) or 1 (ghost image is not visible).

Then, color data is associated to perception data to build the decision tree. Color data associated to perception data is combined in 4 different datasets that are the input to the decision tree algorithm. The principle of the algorithm is to be able predict the 0/1 perception (ghost image is or isn't visible) from the input data only (color data). Out of the 624 perception data points, 70% (randomly selected) are used to train the algorithm and 30% are used for verification.

The datasets are as follows:

| Dataset | List of input variables | | | | |
|---|---|---|---|---|---|
| Cx color | $Rv_{Cx}$ | $a^*_{Cx}$ | $b^*_{Cx}$ | $C^*_{Cx}$ | $h°_{Cx}$ |
| Cc color | $Rv_{Cc}$ | $a^*_{Cc}$ | $b^*_{Cc}$ | $C^*_{Cc}$ | $h°_{Cc}$ |
| Cx and Cc color | Both Cx color & Cc color datasets | | | | |
| Ghost image color | $T_{GI}$ | $a^*_G$ | $b^*_G$ | $C^*_G$ | $h°_G$ |

The dataset that gives the most accurate and simple results is the ghost image color dataset over all the ghost image colorimetric coordinates ($T_{GI}$, a*, b*, C*, h). The algorithm was performed 11 times. All of the attempts had $T_{GI}$ as the most relevant parameters among all the coordinates. Out of these 11 tests:

5 occurrences of the single-condition tree: $T_{GI}>0.0071\%$.

4 occurrences of the single-condition tree: $T_{GI}>0.0063\%$.

2 occurrences of a 3-condition tree, whose primary condition is: $T_{GI}>0.0071\%$.

A predetermined threshold has been determined from a rounded weighted average of the above results (0.0068%).

This predetermined threshold is defined to be below 0.010%, preferably below 0.009%, more preferably below 0.008% and even more preferably below 0.007%.

Each of the 11 trees predicted correctly between 80 and 90% of all 0/1 among the verification data.

CIE 1931 vs CIE 1964

The other reason why CIE 1964 observer is elected is that this non-visibility data shows that the CIE 1964 observer gives a better correlation to observation than the CIE 1931 observer.

Figure 9:
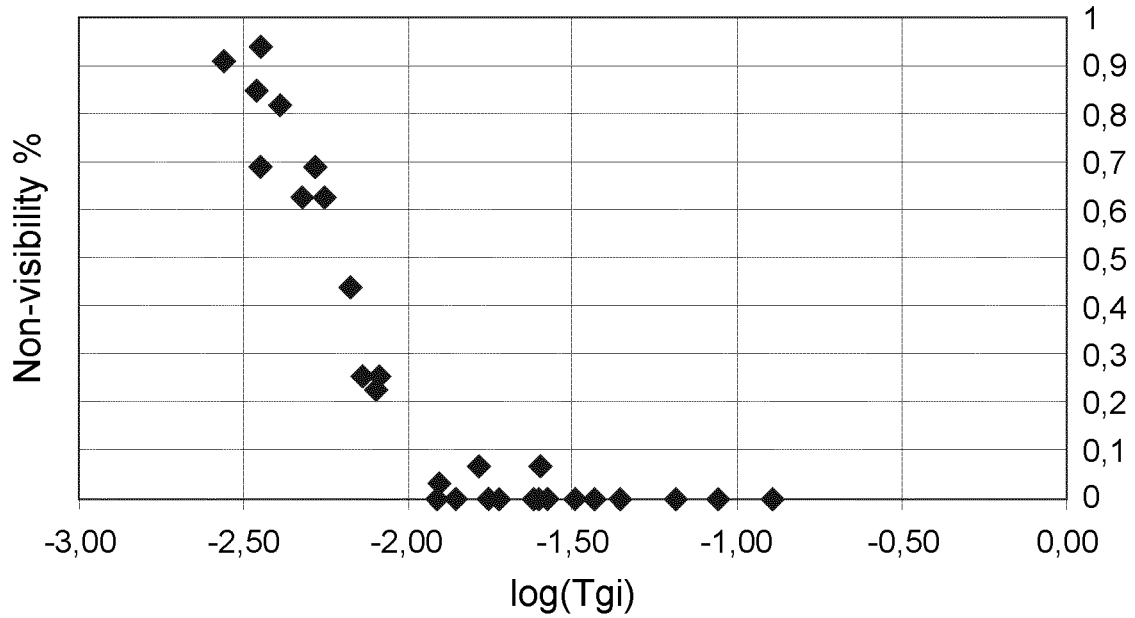
FIG. 9 shows evaluation results of ghost image visibility as a function of the logarithm of the total ghost image transmission for various two-surfaces optical systems.

FIG. 9 shows the rate of people who did not see any ghost image in the internal study (total of '1'='not visible' obtained over total number of observations) as a function of the logarithm of the ghost image transmission coefficient, log ($T_{GI}$).

However, a similar graph using the 1931 observer presents a major outlier, corresponding to a sample comprising a combination of a blue-violet cut coating on the convex side and efficient antireflection coating on the concave side. Since this sample is interesting, it is important that it is taken into account.

3. Correlation of $T_{GI}$ and Scoring by Expert Observers

The study with external observers reproduced one of the set of conditions of the internal study: the LED source, observation on black background in dark environment (see also FIG. 2). Twelve expert observers evaluated each of the 28 lenses on an absolute scale, according to three descriptors characterizing the ghost image: contrast, sharpness, and luminous intensity.

The three descriptors are generated by the 12 observers during two 1-hour sessions. The observers are trained on the descriptors for two 1-hour sessions, to be able to give repeatable and accurately scaled scores that can later be correlated to colorimetric parameters. All 28 lenses are evaluated twice by each expert.

Altogether, each lens gets 24 individual scores for each descriptor.

The scores for each descriptor are heavily correlated, to the extent that we can believe they describe the same quantity. It appears that the Contrast descriptor accounts for 99% of the variations. It means that each of the two other descriptors (sharpness and luminous intensity) differs less than 1% from the Contrast descriptor and using any of the two other descriptors would be equivalent at 99%. Consequently, FIG. 10 only uses the Contrast score.

The data points appear as a log shape. The human perception of luminosity is thus evidenced to vary according to a logarithm of the physical quantity. The results show indeed a strong correlation between the contrast scores evaluated by the experts and the logarithm of the $T_{GI}$.

Figure 10:
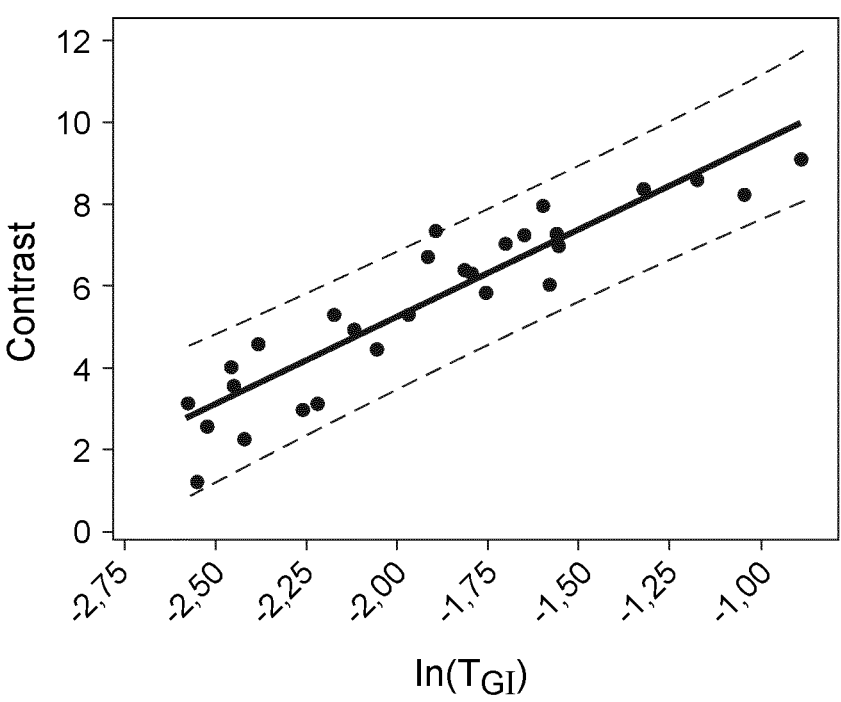
FIG. 10 shows a correlation curve between contrast and logarithm of the total ghost image transmission for various two-surfaces optical systems.

FIG. 10 shows the contrast score versus the logarithm of the $T_{GI}$.

A linear correlation is observed of contrast score with log $(T_{GI})$ on FIG. 10. The correlation to log $(T_{GI})$ in particular has a correlation coefficient $R^2$ over 0.85. In sensory analysis, a $R^2$ coefficient over 0.75 is considered to be good. The dotted lines here correspond to the 95% prediction interval: a new data point would fall within the lines 95% of the time.

The correlation to log (RvCx*RvCc) also seems good, but lower than $T_{GI}$, with a correlation coefficient of 0.75. It should be noted that the parameter of the product RvCx*RvCc does not take substrate absorption or potential compensation of the Cx/Cc reflectances. In the present case, the data comes from Orma lenses only, with very low to no absorption; but other substrates would result in RvCx*RvCc being less accurate.

In conclusion of the two independent methods (the method based on machine learning and respectively the method based on scoring by expert observers and correlated to the $T_{GI}$), the ghost image transmission, or $T_{GI}$ quantity, associated with the threshold value 0.007%, provides a new criterion for ghost image visibility that is adapted to human perception. This criterion takes into account the spectrum of the source. The $T_{GI}$ also accounts for substrate absorption, although the observation was conducted on clear lenses only. The threshold is obtained by observation in specific conditions that are chosen to be close to real-life indoor situations.

This criterion is then used to assess the risk of ghost image of any coating combination, at the step of the coating design.

The $T_{GI}$ criteria for an optical system with two surfaces is extended to optical systems with more than two surfaces, as detailed in the following section.

4. Calculation for Systems with N>2 Surfaces

To that end, the colorimetric parameter of evaluation of ghost image visibility is adapted to a plurality of ghost images. The colorimetric parameter of evaluation of ghost image visibility enables optimization of the combination of coatings on the different surfaces.

Firstly, the curvature combinations of the optical system is identified. Each possible combination of two curvatures is examined based on the following rules:

Combinations of different curvatures (R1, R2) or (R2, R3) are considered separately.

All similar combinations of two curvatures (R1, R2) or (R2, R1) are considered together (except if there is another R3 curvature radius surface between the surfaces of one of the combinations, and not between the surfaces of the others. In that case, that particular combination is excluded).

All combinations of the same curvature (R1, R1) are ignored, except if there is a prism between these two surfaces (in that case, they are not parallel).

This calculation model needs to be adapted for systems with more than two surfaces, taking into account the above rules on curvature combinations.

When the system has more than two surfaces but only combinations of the same two curvatures R1 and R2, the $T_{GI}$ of each combination should not be considered separately: what should be considered for accurate evaluation of the visibility of the ghost image is the sum of the $T_{GI}$ of all these particular combinations. This calculation excludes any ghost image resulting from combinations of surfaces with same curvature R1 and R1.

In this section, we explain methods for calculating the total ghost image transmission coefficient for an optical system having two lenses and four surfaces. However, those skilled in the art will apply this method to other optical systems having more than two surfaces.

We propose two alternative methods to calculate the total ghost image transmission coefficient of the ghost image in transmission formed by light reflected off exactly two surfaces of the transmission optical system.

We consider, for exemplary purpose, an optical system comprising a first lens 1 and a second lens 2 as illustrated on FIG. 4. The first convex surface 11 has a first curvature radius, R1, the second concave surface 12 has the same curvature radius R1, the third convex surface 13 has the same first curvature radius, R1, and the fourth concave surface 14 has a second curvature radius, denoted R2 different from R1.

First Method

Each pair of two different surfaces among the first surface, second surface and the at least another surface having different pairs of curvatures forms a ghost image and each ghost image has a ghost image transmittance depending on the wavelength and the incidence angle.

As schematically illustrated on FIGS. 11 to 13, in the example of a two-lens optical system, the first surface is denoted A, the second surface is denoted B, the third surface is denoted C and the fourth surface is denoted D.

The transmission coefficient of each ghost image is calculated separately as a function of each ghost image transmittance.

According to the first method, the total ghost image transmission coefficient $T_{GI,T}$ of the resulting ghost image is calculated as the sum of the ghost image transmission coefficient of each ghost image, according to the following expressions:

$$T_{GI,T} = T_{GI,AD} + T_{GI,BD} + T_{GI,CD} \text{ with} \tag{III}$$

$$T_{GI,X}(15°) = 100 \frac{\int_{380}^{780} S(\lambda) \, T_{G,X}(\lambda, 15°) \, \bar{y}_{10}(\lambda) \, d\lambda}{\int_{380}^{780} S(\lambda) \, \bar{y}_{10}(\lambda) \, d\lambda} \tag{IV}$$

wherein X represents one of the couples of surfaces: AD, BD or CD; $S(\lambda)$ represents the spectrum of a point light source depending on the wavelength $\lambda$ in the visible spectral range between 380 nm and 780 nm; $T_{G,X}(\lambda, 15°)$ represents the ghost image transmittance formed by the couple of surfaces X for an incidence angle of 15 degrees, and $\bar{y}_{10}(\lambda)$ is the spectral light efficiency for a CIE 1964 photopic observer (or 10° observer).

Here, since the surfaces A, B and C have the same curvature radius, R1, the corresponding ghost image transmittance is not taken into account: $T_{GI,AB}$, $T_{GI,AC}$ and $T_{GI,BC}$.

We will now explain the calculation of each ghost image transmittance $T_{G,X}(\lambda, 15°)$ for each couple X of surfaces among: AD, BD or CD.

$T_{G,AD}$

We consider the combination of the first surface A, of curvature radius R1, and the fourth surface D, of curvature radius R2. A first order ghost image results from internal reflection of the incident light beam 30 on surfaces A and D which form and a first order reflected light beam 41 (see FIG. 11).

The ghost image transmittance $T_{G,AD}$ is calculated following the transmission and reflection coefficients of the different interfaces and substrates whereon the incident light beam 30 is reflected, refracted or transmitted, in series, according to the following expression (V):

$$T_{G,AD}(\lambda, \ 15°)=T_A(\lambda, \ 15°)*T_{intAB}(\lambda, \ \alpha)=T_B(\lambda, \ 15°)*T_C(\lambda, \ 15°)*T_{intCD}(\lambda, \ \beta)*BR_D(\lambda, \ \beta)*T_{intCD}(\lambda, \ \beta)*T_C(\lambda, \ 15°)*T_B(\lambda, \ 15°)*T_{intAB}(\lambda, \ \alpha)*BR_A(\lambda, \ \alpha)*T_{intAB}(\lambda, \ \alpha)*T_B(\lambda, \ 15°)*T_C(\lambda, \ 15°)*T_D(\lambda, \ 15°).$$

Where the incidence angle being set to 15 degrees, $T_Y(\lambda, 15°)$ represents the transmission coefficient through surface Y (Y being selected among surfaces A, B, C and D), depending on the wavelength $\lambda$ and at the incidence angle of 15 degrees;

$T_{intAB}(\lambda, \alpha)$ represents the transmission coefficient between surfaces A and B depending on the wavelength $\lambda$ and at the refraction angle $\alpha$ inside the first lens;

$T_{intCD}(\lambda, \beta)$ represents the transmission coefficient between surfaces C and D depending on the wavelength $\lambda$ and at the refraction angle $\beta$, inside the second lens;

$BR_D(\lambda, \alpha)$ represents the back reflectance coefficient on surface D (i.e. reflection happening inside the substrate of the second lens) depending on the wavelength $\lambda$ and at the refraction angle $\beta$, and $BR_A(\lambda, \alpha)$ represents the back reflectance coefficient on surface A (i.e. reflection happening inside the substrate of the first lens) depending on the wavelength $\lambda$ and at the refraction angle $\alpha$.

The refraction angles $\alpha$ and respectively $\beta$ are determined by the Snell-Descartes laws:

$$n_{air} \sin(15°)=n_{AB} \sin(\alpha)$$

$$n_{air} \sin(15°)=n_{CD} \sin(\beta)$$

wherein $n_{AB}$ represents the refractive index of the substrate supporting surfaces A and B, and, $n_{CD}$ represents the refractive index of the substrate supporting surfaces C and D.

Since the model considers all surfaces flat and parallel, the incidence angle in air is always 15 degrees. In addition, the principle of reversibility of light states that the path of a ray going through in either direction is equivalent. Consequently, all transmittances are correctly evaluated if considered at a 15 deg. incidence angle, from air medium to substrate, whatever the real direction.

Thus, the ghost image transmittance $T_{G,AD}$ is calculated according to the following simplified expression:

$$T_{G,AD}(\lambda, \ 15°) =T_A(\lambda, \ 15°)*BR_D(\lambda, \ \beta)*BR_A(\lambda, \ \alpha)*T_D(\lambda, \ 15°)*(T_B(\lambda, \ 15°))^3*T_{intAB}(\lambda, \ \alpha))^3*(T_C(\lambda, \ 15°))^3*(T_{intCD}(\lambda, \ \beta))^3$$

If there is no air gap between surfaces B and C but another medium, the refraction angle $\gamma$ inside this medium is calculated according to the Snell-Descartes law. If this medium is absorptive, the above formula is updated to consider $T_{intBC}$ at the wavelength $\lambda$, and the angle of refraction $\gamma$.

These formulas do not take polarization of the light into account, so they are not exactly equivalent to the raytracing calculation. However at low incidence angle (i.e. less than 45 degrees), the effect of polarization is generally small.

The ghost image transmission, $T_{GI,AD}$ of the first order ghost image formed by internal reflection between surfaces A and D is then calculated from the ghost image transmittance $T_{G,AD}$ in the same way as the ghost image transmission $T_{GI}$ for a two-surfaces optical system: the ghost image transmission, $T_{GI,AD}$ corresponds to the Y tristimulus value of the ghost image transmittance $T_{G,AD}$ in the CIE XYZ system, with one LED as the light source and CIE 1964 observer (see formula above this part).

$T_{G,BD}$

We consider the combination of the second surface B, of curvature radius R1, and the fourth surface D, of curvature radius R2. A first order ghost image results from internal reflection of the incident light beam 30 on surfaces B and D which form and a first order reflected light beam 42 (see FIG. 12).

The ghost image transmittance $T_{G,BD}$ is calculated following the transmission and reflection coefficients of the different interfaces and substrates whereon the incident light beam 30 is reflected, refracted or transmitted, in series, using similar notations as above, according to the following expression (VI):

$$T_{G,BD}(\lambda, \ 15°) =T_A(\lambda, \ 15°)*T_{intAB}(\lambda, \ \alpha)*T_B(\lambda, \ 15°)*T_C(\lambda, \ 15°)*T_{intCD}(\lambda,\beta)*BR_D(\lambda, \ \beta)*T_{intCD}(\lambda, \ \beta)*T_C(\lambda, \ 15°)*R_B(\lambda, \ 15°)*T_C(\lambda, \ 15°)*T_{intCD}(\lambda, \ 15°)*T_D(\lambda, \ 15°)$$

Or, in simplified version:

$$T_{G,BD}(\lambda, \ 15°)$$

$$T_{G,BD}(\lambda, \ 15°)$$

$$=T_A(\lambda, \ 15°)*T_{intAB}(\lambda, \ \alpha)*T_B(\lambda, \ 15°)*BR_D(\lambda,\beta)*R_B(\lambda, \ 15°)*T_D(\lambda, \ 15°)$$

$$*(T_C(\lambda, \ 15°))^3*(T_{intCD}(\lambda, \ \beta))^3$$

In these expressions, the refraction angle $\alpha$ and respectively $\beta$ are determined by the Snell-Descartes laws as mentioned above.

Similarly, the ghost image transmission, $T_{GI,BD}$ of the first order ghost image formed by internal reflection between surfaces B and D is then calculated from the ghost image transmittance $T_{G,BD}$ in the same way as the ghost image transmission $T_{GI}$ for a two-surfaces optical system: the ghost image transmission, $T_{GI,BD}$ corresponds to the Y tristimulus value of the ghost image transmittance $T_{G,BD}$ in the CIE XYZ system, with one LED as the light source and CIE 1964 observer (see formula above).

$T_{G,CD}$

Similarly, we consider the combination of the third surface C, of curvature radius R1, and the fourth surface D, of curvature radius R2. A first order ghost image results from internal reflection of the incident light beam 30 on surfaces C and D which form and a first order reflected light beam 43 (see FIG. 13).

The ghost image transmittance $T_{G,CD}$ is calculated following the transmission and reflection coefficients of the different interfaces and substrates whereon the incident light beam 30 is reflected, refracted or transmitted, in series, using similar notations as above, according to the following expression (VII):

$$T_{G,CD}(\lambda, \ 15°) = T_A(\lambda, \ 15°) * T_{intAB}(\lambda, \ \alpha) * T_B(\lambda, \ 15°) * T_C(\lambda, 15°) * T_{intCD}(\lambda, \ \beta) * BR_D(\lambda, \ \beta) * T_{intCD}(\lambda, \ \beta) * BR_C(\lambda, \ \beta) * T_{intCD}(\lambda, \ \beta) * T_D)(\lambda, \ 15°)$$

Or, in simplified version:

$$T_{G,CD}(\lambda, \ 15°) = T_A(\lambda, \ 15°) * T_{intAB}(\lambda, \ \alpha) * T_B(\lambda, 15°) * T_C(\lambda, 15°) * BR_D(\lambda, \ \beta) * BR_C(\lambda, \ \beta) * T_D(\lambda, 15°) * (T_{intCD}(\lambda, \ \beta))^3$$

Similarly, the ghost image transmission, $T_{GI,CD}$ of the first order ghost image formed by internal reflection between surfaces C and D is then calculated from the ghost image transmittance $T_{G,CD}$ in the same way as the ghost image transmission $T_{GI}$ for a two-surfaces optical system: the ghost image transmission, $T_{GI,CD}$ corresponds to the Y tristimulus value of the ghost image transmittance $T_{G,CD}$ in the CIE XYZ system, with one LED as the light source and CIE 1964 observer (see formula above).

Then, the total ghost image transmission $T_{GLT}$ of the ghost image formed by superimposition of the ghost images formed by light beams 41, 42 and 43 is calculated by the sum (see equation (III)) of each ghost image transmission $T_{GI,AD}$, $T_{GI,BD}$ and $T_{GI,CD}$ determined according to the above expressions (V), (VI) and (VII).

Second Method

As in the first method, each pair of two different surfaces among the first surface, second surface and the at least another surface having different curvatures forms a ghost image and each ghost image has a ghost image transmittance depending on the wavelength for an incidence angle of 15 degrees.

We consider a two-lens optical system, the first surface is denoted A, the second surface is denoted B, the third surface is denoted C and the fourth surface is denoted D (see FIGS. 11-13).

According to a second method, the total ghost image transmission coefficient, $T_{GI,T}$ formed by superimposing the ghost images arising from light beams 41, 42 and 43 is calculated depending on the sum of each ghost image transmittance, according to the following expression (VIII):

$$T_{GI,T}(15°) = 100 \frac{\int_{380}^{780} S(\lambda) \, (T_{G,AD}(\lambda, \ 15°) + T_{G,BD}(\lambda, \ 15°) + T_{G,CD}(\lambda, \ 15°)) \, \overline{y}_{10}(\lambda) \, d\lambda}{\int_{380}^{780} S(\lambda) \, \overline{y}_{10}(\lambda) \, d\lambda}$$

wherein $S(\lambda)$ represents the spectrum of a point light source depending on the wavelength $\lambda$ in the visible spectral range between 380 nm and 780 nm; $\overline{Y}_{10}(\lambda)$ is the spectral light efficiency for a CIE 1964 photopic observer (or 10° observer), and the ghost image transmittance $T_{G,AD}(\lambda, \ 15°)$, $T_{G,BD}(\lambda, \ 15°)$ and $T_{G,CD}(\lambda, \ 15°)$ are calculated using the expressions (V), (VI) and respectively (VII) detailed in the previous section, in full or simplified version.

In another example, we consider an optical system having three surfaces. The optical system consists for example of a highly absorbing solar glass and a refractive lens, the solar glass being highly absorbing and without mirror coating.

The solar glass is for example clipped onto the refractive lens. The first surface, on the solar glass, is denoted A, the second surface on the solar glass is denoted B, the third surface on the lens is denoted C and the fourth surface on the lens is denoted D.

Since the solar glass is highly absorbing, the components related to surface A can be neglected. For example, the transmission coefficient through the solar clip is Tint=10% or 0.1. This transmission term does not contribute significantly, as $\text{Tint}^2$ is even more unsignificant. Unless the surface A is covered by a mirror coating, having a reflection coefficient high enough to compensate for $\text{Tint}^2$.

We assume that the surfaces A, B and C have the same radius of curvature and that the surface D has a different radius of curvature. In this case, $T_{G,AD}$ is negligeable and there is only one ghost image having a transmittance equal to:

$$T_G = T_{G,BD} + T_{G,CD}$$

wherein $T_{G,BD}$ and $T_{G,CD}$ are calculated using the expressions (VI) and (VII) respectively, detailed in the previous section, in full or simplified version.

The total ghost image transmission coefficient, $T_{GLT}$ of the total ghost image formed by superimposing the ghost images arising from light beams from surfaces B, C and D is calculated depending on the sum of each ghost image transmittance, according to the following expression (IX):

$$T_{GI,T}(15°) = 100 \frac{\int_{380}^{780} S(\lambda) \, (T_{G,BD}(\lambda, \ 15°) + T_{G,CD}(\lambda, \ 15°)) \, \overline{y}_{10}(\lambda) \, d\lambda}{\int_{380}^{780} S(\lambda) \, \overline{y}_{10}(\lambda) \, d\lambda}$$

wherein $S(\lambda)$ represents the spectrum of a point light source depending on the wavelength $\lambda$ in the visible spectral range between 380 nm and 780 nm and $\overline{y}_{10}(\lambda)$ is the spectral light efficiency for a CIE 1964 photopic observer (or 10° observer).

The same method is adapted for an optical system having three surfaces, such as a doublet lens, wherein two lenses are attached by a common interface. This optical system has a first surface, denoted A, a second surface, denoted B, at the interface between the two lenses and a third surface, denoted C. The three surfaces A, B and C have different radius of curvatures, taken two by two. Thus, there are three couples of radius of curvatures. This optical system with three surfaces generates three separate total ghost images denoted respectively AB, AC and BC. The transmittance of each ghost image is calculated respectively using the following formula:

$$T_{G,AB}(\lambda) = T_A(\lambda) * BR_B(\lambda) * BR_A(\lambda) * T_B(\lambda) * T_C(\lambda) * (T_{intAB}(\lambda))^3 * T_{intBC}(\lambda)$$

$$T_{G,AC}(\lambda) = T_A(\lambda) * BR_C(\lambda) * BR_A(\lambda) * T_B(\lambda))^3 * T_C(\lambda) * T_{intAB}(\lambda))^3 * (T_{intBC}(\lambda))^3$$

$$T_{G,BC}(\lambda) = T_A(\lambda) * T_B(\lambda) * BR_C(\lambda) * BR_B(\lambda) * T_C(\lambda) * T_{intBC}(\lambda))^3 * T_{intBC})\lambda)$$

The total ghost image transmission coefficients are calculated for each of the three ghost images using respectively the following formula:

$$T_{GI,1} = 100 \frac{\int_{380}^{780} S(\lambda)\,(T_{G,AD}(\lambda, 15°))\,\overline{y}_{10}(\lambda)\,d\lambda}{\int_{380}^{780} S(\lambda)\,\overline{y}_{10}(\lambda)\,d\lambda}$$

$$T_{GI,2} = 100 \frac{\int_{380}^{780} S(\lambda)\,(T_{G,AC}(\lambda, 15°))\,\overline{y}_{10}(\lambda)\,d\lambda}{\int_{380}^{780} S(\lambda)\,\overline{y}_{10}(\lambda)\,d\lambda}$$

$$T_{GI,3} = 100 \frac{\int_{380}^{780} S(\lambda)\,(T_{G,BC}(\lambda, 15°))\,\overline{y}_{10}(\lambda)\,d\lambda}{\int_{380}^{780} S(\lambda)\,\overline{y}_{10}(\lambda)\,d\lambda}$$

Each one of $T_{GI,1}$, $T_{GI,2}$ and $T_{GI,3}$ must be lower than the predetermined threshold for ghost image visibility.

In summary, for optical systems with more than two surfaces, each total ghost image is the sum of ghost image components generated by the same couples of radius of curvature. An optical system with more than two surfaces, may generate more than one total ghost image. There are as many total ghost images as the number of different couples of radius of curvature. Each total ghost image must be such that its $T_{GI}$ is lower than the predetermined threshold for ghost image visibility ($T_{GI} < 7.10^{-3}$).

The transmittance of the total ghost image is calculated using the following formula:

$$T_G(\lambda) = T_{total\,system}(\lambda) \sum_{XY} (R_A(\lambda) * R_B(\lambda)) \left(\prod_{Z}^{n} T_{int}(\lambda)\right)^2 \left(\prod_{W}^{p} T(\lambda)\right)^2$$

$$T_{total\,system}(\lambda) = \left(\prod_{s}^{m} T_{int}(\lambda)\right)\left(\prod_{I}^{k} T(\lambda)\right)$$

$$T_{GI} = 100 \frac{\int_{380}^{780} S(\lambda) T_G(\lambda)\,\overline{y}_{10}(\lambda)\,d\lambda}{\int_{380}^{780} S(\lambda)\,\overline{y}_{10}(\lambda)\,d\lambda}$$

Wherein XY represents the couples of surfaces X and Y having the same combination of two radius of curvature, Z the substrate or glass plate between the surfaces X and Y, and W each other surface different from A and B located between the surfaces A and B; R representing the reflectance of the considered interface for a specific angle of incidence of the concerned array, T representing the surface transmittance for a specific angle of incidence of the concerned array and $T_{int}$ representing the internal substrate transmission for a specific angle of incidence of the concerned array. In the above formula, the surface transmittances and internal transmissions are squared because they correspond to a round-trip of the light.

$T_{total\,system}(\lambda)$ represents the direct transmission for a beam going through all the substrates and all the surfaces, depending on the wavelength.

Total Ghost Image Threshold for an Optical System Having More than Two Surfaces

The same threshold of 0.010%, preferably 0.009%, more preferably 0.008%, even more preferably 0.007% as for an optical system with only two surfaces applies to the total ghost image transmission coefficient $T_{GI,T}$.

Third Method

Even if ghost images appear in a system of multiple centered surfaces (surfaces with aligned optical axis) when the incident light defines a non-null angle of incidence, an additional method consists in calculating the above mentionned $T_G(\lambda)$, $T_{total\,system}(\lambda)$ and $T_{GI}$ for an angle of incidence of 0°. These calculations lead to $T_{GI}$ values corresponding to ghost image that should not physically exist since calculated for angle of incidence of 0°, but that are comparable to one another to determine a ranking of probability of the occurrence of ghost image between several systems of more than two surfaces. Also, these values could constitute an approximation of the values obtained for non-null incident angles, while being less complex to calculate.

5. Application to Coatings Optimization

Thus, a system and method for evaluating ghost image visibility are provided which enable determining ghost image visibility of an optical system with two or more surfaces, and enables to propose new combinations of coatings preventing ghost images from disturbing the user.

The total ghost image transmission coefficient, $T_{GI,T}$ is optimized to be lower than the predetermined threshold, for example less than 7‰. In particular, the total ghost image transmission coefficient is calculated using a database of known coatings.

The system and method for evaluating ghost image visibility also enable to create an antireflection coating enabling to build an optical system having a surface covered by this antireflection coating, the optical system having a total ghost image transmission coefficient, $T_{GI,T}$ lower than the predetermined threshold.

The system also enables to optimize a combination of antireflection coatings based on a minimization of the total ghost image transmission coefficient, so that $T_{GI,T}$ is lower than the predetermined threshold.

We consider an optical system consisting of two lenses (as in FIG. 4) with three surfaces 11, 12, 13 of the same curvature radius R1 and the fourth surface 14 having a different curvature radius R2. In this case, all possible combinations of two surfaces are either (a) (R1, R2) or (b) (R1, R1). As explained by the combination rules above, only combination (a) result in ghost images, the combination (b) can be ignored.

Each of the four surfaces comprises a coating. However, the coating of the fourth surface 14 with a different curvature radius is a first order parameter for all the individual ghost images. Consequently, in this configuration, the improvement is almost equivalent whether all the coatings on all three parallel surfaces 11, 12, 13 are optimized, or only the coating on the different curvature surface 14 is optimized.

In a first example (see FIG. 14), the coatings on the surfaces 11, 12 and are fixed, and only the coating on the fourth surface 14 varies during the optimization process according to the total ghost image transmission criteria of the optical system. The coatings on the surfaces 11, 12 and 13 may be fixed because the plano part of the system (first lens 1) is provided as is (thus coatings cannot be removed and changed); or the coatings on the first lens 1 are under heavy constraints, so the coating on the surface 14 of the second lens is the preferred lever. This situation may occur for electrochromic lenses at clear state with attached refraction add-on (any prescription), or in the case a clear clip is used on prescription lenses (for example for night drive conditions).

In a second example (see FIG. 15), the coating on the fourth surface 14 is fixed and the coatings on the surfaces 11, 12 and 13 vary in the optimization process according to the total ghost image transmission criteria of the optical system. In this particular configuration, all three coatings on surfaces 11, 12 and 13 contribute as much as the coating on the fourth surface 14 in the first example. So here, changing only one or two coatings (11, 12 and/or 13) is less "efficient" than changing the coating on the fourth surface like in the first example. This situation may correspond to the same optical systems as in the first example, but with different constraints on the coatings. For example, the coating on the fourth surface can be fixed because of tight E-SPF (Eye Solar Protection factor) requirements, or crazing issues.

In a third example (see FIG. 16), the whole system is designed at the same time. The coatings on all four surfaces can be optimized simultaneously according to the total ghost image transmission criteria of the optical system. This configuration allows for more customization. This is the case when there are strong constraints on some coatings optical targets, but there is still at least one degree of freedom in the design of each coating.

In a fourth example (see FIG. 17), the first lens 1 has a low transmission (for example, an added tinted lens or solar clip). In this case, the ghost image that reflects on the first surface 11 may be ignored thanks to the low transmission of the sun lens. As a result, the corresponding ghost image transmittance is especially reduced because the internal reflection on the first surface goes through the tinted lens three times, compared to other ghost images and the direct image that only goes through once. This situation may correspond to the same optical systems as in the previous examples.

Application Example of Antireflection (AR) Coating Selection for an Echromic Cell with Air Gap and Rx Add-On.

The optical system (as illustrated on FIG. 4) comprises a first lens 1 and a second lens 2. The first lens 1 comprises an electrochromic cell, or Echromic cell, that enables to control light by electric power. The first surface 11 and the second surface 12 of the electrochromic cell have the same curvature radius, R1. The second lens 2 comprises a refraction add-on or Rx add-on, the surface 13 having a radius curvature R1 and the fourth surface having a radius curvature R2 different from R1. An air gap is located between the back surface 12 of the first lens and the front surface 13 of the second lens.

The coatings on the first surface 11 and on the second surface 12 of the electrochromic cell are fixed, since they are provided by supplier. Moreover, the components and materials the electrochromic cell is made of are mostly unknown, so the cell has to be characterized for ghost image performance.

The optical system has additional constraints. UV reflectance should be low on the fourth concave surface of the add-on to maintain a good E-SPF. The coatings on surfaces 13 and 14 should be 4-layer coatings, in order to lower the total film thickness, to limit crazing issues, while presenting good AR optical performanes (Rv<1%).

The coating on the third surface 13 comprises the multilayer stack according to the following table I, wherein the layer number is labelled from 1 to 5, along the direction from air to substrate, each layer thickness being in nanometers:

TABLE I

| | multilayer coating on surface 13 | | |
|---|---|---|---|
| Layer | Material | Index@550 nm | Thickness |
| 1 | SiO2 | 1.472563 | 86.3 |
| 2 | SnO2 | 1.82448 | 6.5 |
| 3 | ZrO2 | 1.996951 | 67 |

TABLE I-continued

| | multilayer coating on surface 13 | | |
|---|---|---|---|
| Layer | Material | Index@550 nm | Thickness |
| 4 | SiO2 | 1.472563 | 14.6 |
| 5 | ZrO2 | 1.996951 | 35.9 |

The initial design of the coating on the fourth surface 14 comprises the multilayer stack according to the following table II:

TABLE II

| | initial multilayer coating on surface 14 | | |
|---|---|---|---|
| Layer | Material | Index@510 nm | Thickness |
| 1 | SiO2 | 1.47409 | 77.4 |
| 2 | ITO | 2.0822 | 6.5 |
| 3 | ZrO2 | 2.0038 | 96.1 |
| 4 | SiO2 | 1.47409 | 11.6 |
| 5 | ZrO2 | 2.0038 | 22.5 |

The optimized design of the coating on the fourth surface 14 comprises the multilayer stack according to the following table III:

TABLE III

| | multilayer coating on surface 14 optimized for ghost image | | |
|---|---|---|---|
| Layer | Material | Index@510 nm | Thickness |
| 1 | $SiO_2$ | 1.47409 | 82.01 |
| 2 | $SnO_2$ | 1.84321 | 6.5 |
| 3 | $ZrO_2$ | 2.0038 | 92.47 |
| 4 | $SiO_2$ | 1.47409 | 21.79 |
| 5 | $ZrO_2$ | 2.0038 | 16.82 |

The simulation results in the following performances:

TABLE IV

| | comparison of ghost image transmission for initial and optimized coating design | |
|---|---|---|
| | Initial design on surfaces 13 and 14 | Initial design on surface 13 and optimized design on surface 14 |
| $T_{GI1}$ | 0.0107 | 0.0040 |
| $T_{GI2}$ | 0.0071 | 0.0020 |
| Total $T_{GI}$ | 0.0178 | 0.0060 |
| E-SPF 15° | 25 | 23 |
| E-SPF 35° | 25 | 27 |

In table IV, $T_{GI1}$ corresponds here to $T_{GI,AD}+T_{GI,BD}$ and $T_{GI2}$ corresponds to $T_{GI,CD}$.

The initial coatings design result in a high total $T_{GI}$ of 0.0178. According to the simulation, the optimized coating on concave side 14 is able to bring the total $T_{GI}$ below the identified threshold of 0.007 while keeping good E-SPF performance (around 25).

6. Measurement of the $T_{GI}$ of a System

First, we consider an optical system comprising only one lens, with one convex surface (Cx) and one concave surface (Cc).

The internal reflection ghost image cannot be directly measured and would require very specific spectrometry equipment and conditions of acquisition, so the approach here is to measure independently each of the elements necessary in the calculation (as described in relation with FIG. 7):

$$T_{GI,T}(\lambda, 15°)=T_{Cx}(\lambda, 15°) \cdot R_{BCx}(\lambda,\alpha) \cdot R_{BCc}(\lambda, \alpha) \cdot T_{Cx}(\lambda, \alpha) \cdot T_{int}(\lambda, \alpha)^3$$

The approximations and means of measurement are described below.

| Nature of data (incidence angle) | Approximated to | Measured by |
|---|---|---|
| Cx Transmittance $T_{Cx}(\lambda, 15°)$ | $T_{Cx}(\lambda) = 1 - R_{Cx}(\lambda)$ | SMR on Cx at 15° |
| Cx Back Reflectance $R_{BCx}(\lambda, \alpha)$ | $R_{BCx}(\lambda) = R_{Cx}(\lambda)$ | SMR on Cx at $\alpha = 10°$ |
| Cc Transmittance $T_{Cc}(\lambda, \alpha)$ | $T_{Cc}(\lambda) = 1 - R_{Cc}(\lambda)$ | SMR on Cc at $\alpha = 10°$ |
| Cc Back Reflectance $R_{BCc}(\lambda, \alpha)$ | $R_{BCc}(\lambda) = R_{Cc}(\lambda)$ | SMR on Cc at $\alpha = 10°$ |
| Substrate internal transmittance $T_{int}(\lambda, \alpha)$ | $T_{int}(\lambda) = 1 - A_{int}(\lambda) = R_{tot}(\sim0°) + T_{tot}(0°)$ | Cary50 (at 0°) SMR both sides at 10° |

SMR stands for a reflection measurement system and is generally based on a spectrometer adapted for measuring reflectance of a lens at a determined incidence angle. Cary50 is another apparatus for measuring transmittance at normal incidence angle.

We assume that for non absorptive coatings the sum of reflection (R) and transmission (T) coefficients is equal to one (R+T=1).

We have no means of measuring the back reflectance of a lens $R_{BCx}$ or $R_{BCc}$), so we use the approximation that back reflectance of a lens (i.e. inside the lens) is approximately equal to the front reflectance on the same surface of a lens (i.e. outside the lens).

For absorptive substrate, the sum of reflection (R), transmission (T) and absorption (A) coefficients is equal to one (R+T+A=1). Thus, $T_{int}=1-A=R_{tot}+T_{tot}$. Here, $T_{tot}$ and $R_{tot}$ are the transmittance and reflectance of both sides of the lens. $T_{tot}$ can be measured, however we cannot measure the reflectance at 0° incidence, so it is approximated by reflectance of both sides at 10 degrees incidence angle, which is the lowest possible measurement incidence angle using the multi-incidence SMR.

The ghost image transmittance as a function of wavelength at the incidence angle of 15° is then calculated as the product of the spectral quantities as measured in the previous table, using the following expression:

$$T_G(\lambda, 15°)=T_{Cx}*R_{Cx}*T_{Cx}*R_{Cc}*T_{int}^3$$

Using the described measurement method, we estimated the $T_{GI}$ for three lenses available on the market which have ghost image visibility issue, and compiled the results in the table below.

| | Indofin ES eNERGY Blue | Holt Triple Care | Nevamax Blue UV |
|---|---|---|---|
| $T_{GI}$ (estimation by measurement) | 0.031 | 0.027 | 0.043 |

These examples show that the $T_{GI}$ calculation is the quantity that represents quantitatively the most accurately perception (as compared to scores by experts), because it is based on complete and accurate information of the optical system, of the light source and of the observer.

Then, $T_{GI}$ is calculated from this spectrum as the Y tristimulus value with a LED light source and 1964 observer.

In the tables below are presented the simulation results for a few single-lens ophthalmic systems that verify the condition for colorimetric parameter of ghost image transmission coefficient $T_{GI}<0.007\%$ and the description of each stack.

| Cx design | Blue AR | Blue AR | Orange mirror | Blue mirror | Green AR | Copper AR |
|---|---|---|---|---|---|---|
| Cc design | Copper AR | Green AR | Blue AR | Copper AR | Copper AR | Copper AR |
| $T_{GI}$ | 0.0028 | 0.0036 | 0.0036 | 0.0048 | 0.0052 | 0.0067 |

The multilayer coatings structure and composition are detailed in the following tables:

| Copper AR | | |
|---|---|---|
| Layer | Material | Thickness (nm) |
| 1 | SiO2 | 71.7 |
| 2 | SnO2 | 6.5 |
| 3 | ZrO2 | 91.1 |
| 4 | SiO2 | 29.2 |
| 5 | ZrO2 | 15.7 |
| 6 | SiO2 | 150 |

| Green AR | | |
|---|---|---|
| Layer | Material | Thickness (nm) |
| 1 | SiO2 | 80.9 |
| 2 | SnO2 | 6.5 |
| 3 | ZrO2 | 80.5 |
| 4 | SiO2 | 21.6 |
| 5 | ZrO2 | 26.8 |
| 6 | SiO2 | 150 |

| Blue mirror | | |
|---|---|---|
| Layer | Material | Thickness (nm) |
| 1 | SiO2 | 112.3 |
| 2 | SnO2 | 6.5 |
| 3 | ZrO2 | 59.8 |
| 4 | SiO2 | 40.3 |
| 5 | ZrO2 | 33.0 |

Blue AR

| Layer | Material | Thickness (nm) |
|---|---|---|
| 1 | SiO2 | 92.4 |
| 2 | SnO2 | 6.5 |
| 3 | ZrO2 | 80.5 |
| 4 | SiO2 | 22.5 |
| 5 | ZrO2 | 21.2 |
| 6 | SiO2 | 150 |

Green mirror (G)

| Layer | Material | Thickness (nm) |
|---|---|---|
| 1 | SiO2 | 92.3 |
| 2 | SnO2 | 6.5 |
| 3 | ZrO2 | 125.3 |

Orange mirror (O)

| Layer | Material | Thickness (nm) |
|---|---|---|
| 1 | SiO2 | 77.1 |
| 2 | SnO2 | 6.5 |
| 3 | ZrO2 | 61.0 |
| 4 | SiO2 | 29.4 |
| 5 | ZrO2 | 16.5 |

Other examples for copper anti-reflective coating (or Copper AR) correspond to examples 9, 10 and 11 disclosed in patent application WO012/076714 and herein incorporated. More generally, the copper anti-reflective coating comprises a multi-layered stack comprising at least six layers, said multi-layered stack comprising, along a direction going away from the substrate, a silicon dioxide layer having a thickness of about 150 nm, a layer of zirconium dioxide having a thickness of from 14 nm to 16 nm, a silicon dioxide layer having a thickness of from 28 nm to 32 nm, a layer of zirconium dioxide having a thickness of from 87 nm to 93 nm, a layer of tin oxide or indium-tin oxide having a thickness of about 6.5 nm, and a silicon dioxide layer having a thickness of from 71.7 nm to 77 nm.

According to a particular and advantageous example, the optical system comprises a copper anti-reflective coating on a concave surface and at least one of a blue mirror or a blue anti-anti-reflective coating on a convex surface.

Finally, we consider an optical system with more than two surfaces (N>2). Depending on the system, a $T_{GI}$ measurement method may be possible for this kind of system. For this, the measurement of each of the terms of the equations are necessary (refer to expressions (III) to (VIII)). To that end, we need to disassemble the optical system (if it is made of two assembled lenses), in order to measure reflectance and transmittance of each surface or group of surfaces. The main issue, as for a 2-surfaces system, is the internal transmittance of the substrate materials. For a dismantled optical system, the internal transmittance can be approximated with a full transmittance and full reflectance for each of the lenses.

Although representative processes and optical systems have been described in detail herein, those skilled in the art will recognize that various substitutions and modifications may be made without departing from the scope of what is described and defined in the appended claims.

8. Application to Optical Systems Having Three or Four Surfaces

The method and system is applied to an optical system having more than two surfaces, for example four surfaces.

In a first example, the optical system comprises an electrochromic cell attached to a lens. The electrochromic cell has two surfaces having the same radius of curvature (S1, S1). The lens has a first surface having the same radius of curvature S1 and a second surface having a different radius of curvature S2. This optical system generates a single ghost image, having a total ghost image transmission formed by three components S1S2.

In a second example, the optical system comprises a clip attached to a lens. The lens has a first surface having a first radius of curvature S1 and a second surface having a different radius of curvature S2. The clip, or plano-lens, has two surfaces having the same radius of curvature (S3, S3) different from the closest surface of the lens. This optical system generates three distinct ghost images, each ghost image having a total ghost image transmission formed by two components as follows. A first total ghost image generated by the two surfaces of the lens; a second total ghost image generated by the first surface of the lens and respectively the two surfaces of the clip of same radius of curvature (S1S3+S1S3); and a third total ghost image generated by the second surface of the lens and respectively the two surfaces of the clip of same radius of curvature (S2S3+S2S3).

In a third example, the optical system comprises a clip attached to a plano-glass. The plano-glass has two surfaces having the same radius of curvature (S1, S1). The clip, also plano, has two surfaces having the same radius of curvature (S3, S3) different from the surface of the lens. This optical system generates a single ghost image, having a total ghost image transmission formed by four components as follows: a first component from the first surface S1 of the lens and the first surface S3 of the clip; a second component from the second surface S1 of the lens and the first surface S3 of the clip; a third component from the first surface S1 of the lens and the second surface S3 of the clip; and a fourth component from the second surface S1 of the lens and the second surface S3 of the clip.

The invention claimed is:

1. A transmission optical system having at least a first surface and a second surface, the first surface and the second surface having different curvatures and/or the first surface and the second surface being disposed to provide dioptric power, wherein the transmission optical system has a colorimetric parameter of evaluation of ghost image visibility lower than a predetermined threshold for ghost image visibility, said colorimetric parameter of evaluation being based on total ghost image transmission coefficient of at least one ghost image formed by internal reflection of a light beam from a light source between at least the first surface and the second surface and by transmission through the optical system, the light beam from the light source being incident on the first surface with a non-null incidence angle, the total ghost image transmission coefficient resulting from integration of ghost image transmittance of said at least one ghost image over a visible spectral band and depending on a spectrum of the light source and on spectral light efficiency for a CIE 1964 photopic observer, wherein the ghost image has a ghost image transmittance calculated using the following formula:

$$T(\lambda,15°)=T_{Cx}(\lambda,15°).R_{BCc}(\lambda,\alpha).R_{BCx}(\lambda,\alpha).T_{Cc}(\lambda,\alpha).(T_{ini}(\lambda,\alpha))^2$$

where $\lambda$ represents the wavelength in the visible spectrum, the incidence angle of the light source being set to 15 degrees and corresponding to an angle of refraction $\alpha$ inside a substrate supporting the first surface and the second surface, $T_{Cx}$ $(\lambda,15°)$ represents the spectral transmission of the first surface at said incidence angle, $R_{BCc}$ $(\lambda,\alpha)$ represents the spectral reflection of the second surface at said angle of refraction $\alpha$ for reflection occurring inside of the substrate medium, $R_{BCx}$ $(\lambda,\alpha)$ the spectral reflection of the first surface for a reflection occurring inside of the substrate medium, $T_{Cc}$ $(\lambda,\alpha)$ the spectral transmission of the second surface and $T_{int}$ $(\lambda,\alpha)$ the spectral transmission between the first surface and second surface.

2. The transmission optical system of claim 1, wherein the total ghost image transmission coefficient is calculated using the following formula:

$$\tau_{GI}(15°) = 100\frac{\int_{380}^{780} S(\lambda)\ T(\lambda,\ 15°)\ \bar{y}_{10}(\lambda)\,d\lambda}{\int_{380}^{780} S(\lambda)\bar{y}_{10}(\lambda)\,d\lambda}$$

wherein the visible spectral band extends between 380 and 780 nanometers, $S(\lambda)$ represents spectral luminance of the light source, and $\bar{y}_{10}(\lambda)$ represents spectral light efficiency for a CIE 1964 photopic observer.

3. The transmission optical system of claim 2, wherein the first surface comprises a first coating and the second surface comprising a second coating.

4. The transmission optical system of claim 2, wherein the predetermined threshold for ghost image visibility is less than 0.010%.

5. The transmission optical system of claim 4, wherein the predetermined threshold for ghost image visibility is 0.007%.

6. The transmission optical system of claim 1, wherein the first surface comprises a first coating and the second surface comprises a second coating.

7. The transmission optical system of claim 6, wherein the transmission optical system further comprises at least another surface comprising another coating, each pair of two different surfaces among the first surface, second surface and at least another surface having a same pair of curvatures forming a component of a same particular ghost image having a component ghost image transmittance, and wherein the first coating, second coating and said another coating are configured so that for the same particular ghost image, the total ghost image transmission coefficient is calculated as a function of a sum of the different components of the same particular ghost image transmittance and is lower than the predetermined threshold.

8. The transmission optical system of claim 7, wherein the total ghost image transmission coefficient of each ghost image is calculated using the following formula:

$$\tau_{GI}(15°) = 100\frac{\int_{380}^{780} S(\lambda)\sum T(\lambda,\ 15°)\ \bar{y}_{10}(\lambda)\,d\lambda}{\int_{380}^{780} S(\lambda)\ \bar{y}_{10}(\lambda)\,d\lambda}$$

wherein the visible spectral band extends between 380 and 780 nanometers, $S(\lambda)$ represents spectral luminance of the light source, $\bar{y}_{10}(\lambda)$ represents spectral light efficiency for a CIE 1964 photopic observer and $\Sigma T(\lambda,15\%)$ represents the sum of all the ghost image transmittance components of each pair of two surfaces having a same couple of curvatures.

9. The transmission optical system of claim 8, wherein the total ghost image transmission coefficient is further based on a number of surfaces of the transmission optical system, on transmission coefficients of each surface and on transmission coefficients of each substrate supporting the surfaces of the transmission optical system.

10. The transmission optical system of claim 1, wherein the predetermined threshold for ghost image visibility is less than 0.010%.

11. The transmission optical system of claim 10, wherein the predetermined threshold for ghost image visibility is 0.007%.

12. A transmission optical system having at least a first surface and a second surface, the first surface and the second surface having different curvatures and/or the first surface and the second surface being disposed to provide dioptric power, wherein the transmission optical system has a colorimetric parameter of evaluation of ghost image visibility lower than a predetermined threshold for ghost image visibility, said colorimetric parameter of evaluation being based on total ghost image transmission coefficient of at least one ghost image formed by internal reflection of a light beam from a light source between at least the first surface and the second surface and by transmission through the optical system, the light beam from the light source being incident on the first surface with a non-null incidence angle, the total ghost image transmission coefficient resulting from integration of ghost image transmittance of said at least one ghost image over a visible spectral band and depending on a spectrum of the light source and on spectral light efficiency for a CIE 1964 photopic observer, wherein the first surface comprises a first coating and the second surface comprising a second coating, and wherein the transmission optical system further comprises at least another surface comprising another coating, wherein each pair of two different surfaces among the first surface, second surface and the at least another surface having different pairs of curvatures forms a particular ghost image, and each particular ghost image having a particular ghost image transmittance, and wherein the first coating, second coating and said another coating are configured so that each particular ghost image has a total ghost image transmission coefficient lower than the predetermined threshold, wherein the ghost image transmittance of a total ghost image is calculated using the following formula:

$$T_G(\lambda) = T_{total\,system}(\lambda)\sum_{XY}(R_X(\lambda)*R_Y(\lambda))\left(\prod_Z^n T_{int}(\lambda)\right)^2\left(\prod_W^p T(\lambda)\right)^2$$

$$T_{total\,system}(\lambda) = \left(\prod_s^m T_{int}(\lambda)\right)\left(\prod_l^k T(\lambda)\right)$$

$$T_{GI} = 100\frac{\int_{380}^{780} S(\lambda)T_G(\lambda)\ \bar{y}_{10}(\lambda)\,d\lambda}{\int_{380}^{780} S(\lambda)\ \bar{y}_{10}(\lambda)\,d\lambda}$$

wherein XY represents any couple of surfaces X and Y having a same combination of two radius of curvature, Z any substrate between the surfaces X and Y, and W each other surface different from surfaces X and Y located between the surfaces X and Y, R representing the reflectance of the considered interface, T representing the surface transmittance and $T_{int}$ representing transmission of said substrate.

13. The transmission optical system of claim 12, wherein the total ghost image transmission coefficient is further based on a number of surfaces of the transmission optical system, on transmission coefficients of each surface and on transmission coefficients of each substrate supporting the surfaces of the transmission optical system.

14. A method for evaluating ghost image visibility of a transmission optical system having at least a first surface and a second surface, the first surface and the second surface having different curvatures and/or the first surface and the second surface being disposed to provide dioptric power, said method comprising a step of determining a colorimetric parameter of evaluation of ghost image visibility, said colorimetric parameter of evaluation being based on total ghost image transmission coefficient of at least one ghost image formed by internal reflection of a light beam from a light source between the first surface and the second surface and by transmission through the optical system, the light beam from the light source being incident on the first surface with a non-null incidence angle, the total ghost image transmission coefficient resulting from integration of ghost image transmittance of said at least one ghost image over a visible spectral band and depending on a spectrum of the light source and on spectral light efficiency for a CIE 1964 photopic observer, wherein the ghost image has a ghost image transmittance calculated using the following formula:

$$T(\lambda,15°)=T_{Cx}(\lambda,15°).R_{BCc}(\lambda,\alpha).R_{BCx}(\lambda,\alpha).T_{Cc}(\lambda,\alpha).$$
$$(T_{int}(\lambda,\alpha))^3$$

where $\lambda$ represents the wavelength in the visible spectrum, the incidence angle of the light source being set to 15 degrees and corresponding to an angle of refraction $\alpha$ inside a substrate supporting the first surface and the second surface, $T_{Cx}$ ($\lambda$,15°) represents the spectral transmission of the first surface at said incidence angle, $R_{BCc}$ ($\lambda$,$\alpha$) represents the spectral reflection of the second surface at said angle of refraction $\alpha$ for reflection occurring inside of the substrate medium, $R_{BCx}$ ($\lambda$,$\alpha$) the spectral reflection of the first surface for a reflection occurring inside of the substrate medium, $T_{Cc}$ ($\lambda$,$\alpha$) the spectral transmission of the second surface and $T_{int}$ ($\lambda$,$\alpha$) the spectral transmission between the first surface and second surface.

15. A method for optimizing at least one anti-reflective coating of a transmission optical system having at least a first surface and a second surface, the first surface comprising a first coating and the second surface comprising a second coating, wherein at least one of the first coating and the second coating is an anti-reflective coating, the first surface and the second surface having different curvatures and/or the first surface and the second surface being disposed to provide dioptric power, said method comprising the steps of:

a) determining a colorimetric parameter of evaluation of ghost image visibility, said colorimetric parameter of evaluation being based on total ghost image transmission coefficient of at least one ghost image formed by internal reflection of a light beam from a light source between the first surface and the second surface, and by transmission through the optical system, the light beam from the light source being incident on the first surface with a non-null incidence angle, the total ghost image transmission coefficient resulting from integration of ghost image transmittance of said at least one ghost image over a visible spectral band and depending on a spectrum of the light source and on spectral light efficiency for a CIE 1964 photopic observer, wherein the ghost image has a ghost image transmittance calculated using the following formula:

$$T(\lambda,15°)=T_{Cx}(\lambda,15°).R_{BCc}(\lambda,\alpha).R_{BCx}(\lambda,\alpha).T_{Cc}(\lambda,\alpha).$$
$$(T_{int}(\lambda,\alpha))^3$$

where $\lambda$ represents the wavelength in the visible spectrum, the incidence angle of the light source being set to 15 degrees and corresponding to an angle of refraction $\alpha$ inside a substrate supporting the first surface and the second surface, $T_{Cx}$ ($\lambda$,15°) represents the spectral transmission of the first surface at said incidence angle, $R_{BCc}$ ($\lambda$,$\alpha$) represents the spectral reflection of the second surface at said angle of refraction $\alpha$ for reflection occurring inside of the substrate medium, $R_{BCx}$ ($\lambda$,$\alpha$) the spectral reflection of the first surface for a reflection occurring inside of the substrate medium, $T_{Cc}$ ($\lambda$,$\alpha$) the spectral transmission of the second surface and $T_{int}$ ($\lambda$,$\alpha$) the spectral transmission between the first surface and second surface;

b) modifying a structure and/or composition of the first coating and/or of the second coating; and c) iterating steps a) and b) until the transmission optical system has a colorimetric parameter of evaluation of ghost image visibility lower than a predetermined threshold for ghost image visibility.

16. A system for evaluating ghost image visibility of a transmission optical system having at least a first surface and a second surface, the first surface and the second surface having different curvatures and/or the first surface and the second surface being disposed to provide dioptric power, said system for evaluating ghost image visibility comprising a processor configured to determine a colorimetric parameter of evaluation of ghost image visibility, said colorimetric parameter of evaluation being based on total ghost image transmission coefficient of at least one ghost image formed by internal reflection of a light beam from a point light source between the first surface and the second surface and by transmission through the optical system, the light beam from the light source being incident on the first surface with a non-null incidence angle, the total ghost image transmission coefficient resulting from integration of ghost image transmittance of said at least one ghost image over a visible spectral band and depending on a spectrum of the light source and on spectral light efficiency for a CIE 1964 photopic observer, wherein the ghost image has a ghost image transmittance calculated using the following formula:

$$T(\lambda,15°)=T_{Cx}(\lambda,15°).R_{BCc}(\lambda,\alpha).R_{BCx}(\lambda,\alpha).T_{Cc}(\lambda,\alpha).$$
$$(T_{int}(\lambda,\alpha))^3$$

where $\lambda$ represents the wavelength in the visible spectrum, the incidence angle of the light source being set to 15 degrees and corresponding to an angle of refraction $\alpha$ inside a substrate supporting the first surface and the second surface, $T_{Cx}$ ($\lambda$,15°) represents the spectral transmission of the first surface at said incidence angle, $R_{BCc}$ ($\lambda$,$\alpha$) represents the spectral reflection of the second surface at said angle of refraction $\alpha$ for reflection occurring inside of the substrate medium, $R_{BCx}$ ($\lambda$,$\alpha$) the spectral reflection of the first surface for a reflection occurring inside of the substrate medium, $T_{Cc}$ ($\lambda$,$\alpha$) the spectral transmission of the second surface and $T_{int}$ ($\lambda$,$\alpha$) the spectral transmission between the first surface and second surface.

17. The system for evaluating ghost image visibility of claim 16, wherein the transmission optical system has a third surface and/or a fourth surface, said system for evaluating ghost image visibility comprises a processor configured to determine a total ghost image transmission coefficient of 5 each ghost image formed by internal reflection of the light beam between all pairs of surfaces having a same couple of two different curvatures, the total ghost image transmission coefficient depending on a sum of each ghost image transmittance component for all pairs of surfaces having the same 10 couple of two different curvatures.

18. The system for evaluating ghost image visibility of claim 16, wherein the transmission optical system has a third surface and/or a fourth surface, said system for evaluating ghost image visibility comprises a processor configured to 15 determine the ghost image transmission coefficient of each ghost image formed by internal reflection of the light beam between each couple of surfaces having two different curvatures, the total ghost image transmission coefficient depending on a sum of the ghost image transmission coefficient of each ghost image. 20

\* \* \* \* \*